(12) United States Patent
Zimmer et al.

(10) Patent No.: US 7,043,716 B2
(45) Date of Patent: May 9, 2006

(54) SYSTEM AND METHOD FOR MULTIPLE LEVEL ARCHITECTURE BY USE OF ABSTRACT APPLICATION NOTATION

(75) Inventors: Adam Zimmer, Waterloo (CA); Michael Neame, Waterloo (CA); Avery Pennarun, Montreal (CA)

(73) Assignee: Arius Software Corporation, Waterloo (CA)

( * ) Notice: Subject to any disclaimer, the term of this patent is extended or adjusted under 35 U.S.C. 154(b) by 554 days.

(21) Appl. No.: 09/879,186

(22) Filed: Jun. 13, 2001

(65) Prior Publication Data

US 2003/0051226 A1   Mar. 13, 2003

(51) Int. Cl.
  G06F 9/44   (2006.01)
(52) U.S. Cl. .................... 717/107; 717/112; 715/513
(58) Field of Classification Search ........ 717/100–123; 709/248–251; 715/512–516
  See application file for complete search history.

(56) References Cited

U.S. PATENT DOCUMENTS

| | | | |
|---|---|---|---|
| 4,706,212 A | 11/1987 | Toma | |
| 5,210,837 A | 5/1993 | Wiecek | |
| 5,230,049 A | 7/1993 | Chang | |
| 5,390,314 A | 2/1995 | Swanson | |
| 5,530,863 A | 6/1996 | Hino | |
| 5,640,575 A | 6/1997 | Maruyama et al. | |
| 5,768,603 A | 6/1998 | Brown et al. | |
| 5,805,832 A | 9/1998 | Brown et al. | |
| 6,021,272 A | 2/2000 | Cahill et al. | |
| 6,031,993 A | 2/2000 | Andrews | |
| 6,091,897 A | 7/2000 | Yates et al. | |

OTHER PUBLICATIONS

Carlos Matos, "Managing The Process of Middle-Tier Integration Through the Usage of Extensible Markup Language (XML)", http://www.cs.colorado.edu/~getrich/Classes/csci5817/Term_Papers/matos, pp. 1-10,May 1999.*

(Continued)

*Primary Examiner*—Ted T. Vo
(74) *Attorney, Agent, or Firm*—Blake, Cassels & Graydon; John R. S. Orange; Sean X. Zhang

(57) ABSTRACT

A system and method of translating an abstract notation of an application to a series of sub-applications representing a central application. Also described is a multi-tier application system for generating the central application for deployment on a predetermined combination of selected components. The system comprises an abstract notation description file to contain data for the central application. The system also has an application editor for entering a selected set of input parameters to provide the data, and an application generator for transforming the data from the abstract notation to a selected platform notation corresponding to the selected components. The selected notation is contained in the central application, wherein the deployment of the central application monitors the communication of component data between the selected components. The sub-application can be generated for a variety of computer platforms or languages for deployment on an n-tier system, as directed by the intended components. The central application can be applied to distributed web data-centric application.

7 Claims, 18 Drawing Sheets

OTHER PUBLICATIONS

Eisenstein et al., "Applying Model-Based Techniques to the Development of UIs for Mobile Computers", ACM, pp. 69-76, Jan. 2001.*

Biancheri, "EIHA?!?: Deploying Web and WAP Services Using XML Technology", ACM, pp.: 5-12, Mar. 2001.*

Han et al., "WebSplitter: A Unified XML Framework for Multi-Device Collaborative Web Browsing", ACM, pp.: 221-230, Dec. 2000.*

* cited by examiner

| | id | type | | Name | Value |
|---|---|---|---|---|---|
| 41 | batch_trans | Screen | | name | ConnectedAccounting |
| 42 | batch_trans_grid | Grid | | security | |
| 43 | batch_trans_query | Query | | row | |
| 44 | batches | Table | | column | |
| 45 | calogin | Login | | rowspan | |
| 46 | companies | Table | | columnspan | |
| 47 | company_address | Field | | fill | |
| 48 | company_name | Field | | anchor | |
| 49 | company_sys_date | Field | | width | |
| 50 | companyquery | Query | | height | |
| 51 | description | Image | | buttons | |
| 52 | general_ledger | SpeedMenu | | buttonlocation | |
| 53 | income_statementGenerator | ReportGenerator | | querysystem | PassThru |
| 54 | income_statementPanel | ReportPanel | | appname | ca |
| 55 | income_statementScreen | Screen | | platform | |
| 56 | income_statement_image | Image | | servername | |
| 57 | main | Application | | delay | |
| 58 | passwordInputBox | InputBox | | name | ConnectedAccounting |
| 59 | rec_acc_patent_query | Query | | debug | true |
| 60 | reports | Screen | | datasource | |
| 61 | reports_title_image | Image | | | |
| 62 | speed | SpeedNav | | | |
| 63 | title | Image | | | |

Edit Entity Param

OK  Cancel  Apply  Refresh

Fig. 8d

| UI Tier (14) | Pass-Through (24) | Enterprise JavaBeans (EJB) (28a) | Component Object Model (COM) (28b) | Custom (148) |
|---|---|---|---|---|
| Java Desktop (18a) | In-house desktop application connecting directly to in-house database server. | High demand in-house desktop application connecting to in-house EJB system. | In-house desktop application connecting to in-house COM system. | |
| Java Applet (18b) | Intranet application access to in-house database server. | High demand intranet application connecting to EJB server. | High demand intranet application connecting to COM server. | Java interface to custom data store. |
| Servlet HTML (18d) | Low-medium demand data driven website. | High demand data driven website connecting to EJB server. | High demand data driven website connecting to COM server. | Web interface to custom data store. |
| Servlet WAP (18c) | Low-medium demand cell phone data access. | High demand cell phone data access connecting to EJB server. | High demand cell phone data access connecting to COM server. | Cell phone interface to custom data store. |

Fig. 11

SYSTEM AND METHOD FOR MULTIPLE LEVEL ARCHITECTURE BY USE OF ABSTRACT APPLICATION NOTATION

The present invention relates to methods and systems for the transformation of languages and computer platforms.

BACKGROUND OF THE INVENTION

Software capabilities and requirements are rapidly advancing in the present field of computer technology. Companies all over the world desire robust and versatile software solutions to help their businesses expand and excel. However, in spite of overwhelming demand, many companies find that the available software solutions are limited in selection, and that the software solutions are generally developed to support only one programming platform. Accordingly, many companies are struggling with a wide variety of choices for client platforms, transaction servers, and data base systems, while at the same time facing the challenge of integrating them all into one working solution. In general, software applications interact with objects, which are a collection of procedures defining a procedural logic of the application. It is desired that these objects can be used by multiple applications and systems, however this ability is typically limited because objects tend to be designed as platform specific. Accordingly, an object designed for one application that functions on one platform may not be easily accessible by another software application written for a different platform. Therefore, this limitation has made the sharing of objects across different systems and platforms difficult, thus making the sharing objects over an Internet environment problematic.

In the past, many programming languages and applications have been developed for use in computation. Early languages were often very closely tied to the physical hardware of the device being programmed. As the complexity of software grew, it became advantageous to develop systems which abstracted away most of this complexity from the user. Accordingly, the need for adaptability in software applications has intensified in the past few years, as a result of the growth of the Internet, from a large number of companies attempting to extend their business practices to the World Wide Web. Companies of today are concerned with providing highly distributed software applications that are fully accessible over the Internet. Accordingly, users of the company services expect to access their data from any number of devices such as wireless hand held devices, web browsers, and their desktops, regardless of the operating system they are implementing. Accordingly, software programmers today must often develop and customize the same application several times in a variety languages to work in these different environments. Attempts have been made to run the same program somewhat modified for different platforms, however this typically results in a poor output as the code is not optimized to the constraints of each and every target machine to which it is applied. For example, the desire to run a rich desk top application but on a light weight hand held device.

A further problem is that many companies wish to adapt their existing software systems, such as Legacy applications with character based interfaces and hardware, to scalable Internet enabled modem systems. Accordingly, shifting from Legacy based applications typically involves choosing between continuing to develop new code on an expensive antiquated system, or getting rid of existing equipment and purchasing new adaptable hardware and corresponding software applications.

In view of the above discussed application constraints, there have been several approaches in the past used to simplify application development for multiple platforms. The earliest attempts were centered around a preprocessor, which is a straight forward device that takes an input file written in a specific software language, containing not only language specific statements but also preprocessor directives. The directives helped the user to create macros or short hand phrases which represented more complicated constructs. In turn, more complicated directives were developed to allow the porting of applications from one computer system to another. However, the main draw back to preprocessors is that the source code is interspersed with preprocessor directives, which becomes more complicated to read. In addition, the underlying complexities of the different platforms, while dealt with, are no way hidden from the user, thereby requiring the user to determine which portions of their code must be modified for the various selected platforms. This can be a labor intensive and accordingly costly procedure.

A second generation of software tools was developed to isolate the user from details of the underlying architecture. The second generation tools were more intelligent allowing the user to specify segments of their code in a language independent format. The source code was then passed through a preprocessor where dependent code was added to the source file, examples of which include SQL pre-compilers. However, pre-compilers are generally limited to a section of the source code which is capable of being written in the independent format. This process helps to remove the underlying details of language specific libraries but does not substantially reduce the volume of code necessary to write a given application.

A further attempted solution to the transport of an application to multiple platforms is translators. Many translation routines exist which allow one language to be converted to another, which fall into the two broad categories of natural language systems and artificial language systems. However, in natural language systems exact translation can be difficult to obtain and therefore probabilities and pattern matching must be used. Although, this approach is unacceptable for computer languages as the translations must be deterministic and accurate. Accordingly, artificial language systems have focused on translation from one known language to another by a well understood medium. The construction of translators, so that language specific code is modularized and reusable, is generally accomplished by parsing the input program and constructing a single or series of abstract syntax trees. The syntax trees represent a language independent view of the operations at a low level. The translation process involves first manipulation of this representation and then reversal of the process, which is generating the translated code from the syntax tree. One example of this process is taught by U.S. Pat. No. 6,031,993 by Andrews et al. This patent describes a method, system, and apparatus for translating one computer language to another using a doubly routed tree data structure. The structure is a combination of two sets of hierarchical related objects sharing a common set of leaves. The object of the patent is to provide a method and apparatus for automatically translating the source code from one high level computer language to the source code of another language. However, the construction of the routed tree structures is performed on a source code by source code basis. This can be a relatively expensive approach as the code must be broken down and then re-assembled. A second disadvantage is that it is difficult for humans in understanding the abstract representation, wherein the interpretation of a single line of code could involve numerous nodes.

A more recent approach to solving portability concerns has been the advent of virtual machine based architecture, wherein virtual instructions are executed by converting them into real instructions which can be executed on the actual machine. Several such architecture exist today, from interpreting bit codes at a hardware level to application servers which dynamically re-interpret their source documents depending upon the calling process requirements. However, one disadvantage to these interpretative systems is that substantial performance penalties are imposed by them as each time the system is accessed, the translation of the calls must be done anew. This has to a certain extent been mitigated by the use of cashing architectures but performance penalties still remain.

It is an object of the present invention to obviate or mitigate some of the above presented disadvantages.

SUMMARY OF THE INVENTION

According to the present invention there is provided a multi-tier application system for generating a central application for deployment on a predetermined combination of selected components. The system comprises:
 a) an abstract notation description file to contain data for the central application;
 b) an editor for entering a selected set of input parameters to provide the data; and
 c) an application generator for transforming the data from the abstract notation to a selected platform notation corresponding to the selected components, the selected notation contained in the central application;
 wherein the deployment of the central application, monitors the communication of component data between the selected components.

According to a further aspect of the present invention there is provided a method for generating a central application for deployment on a predetermined combination of components selected from a multi-tier environment. The method comprises the steps of:
 a) selecting input parameters for representing data for the central application;
 b) combining the input parameters for producing and abstract notation description file comprising the data;
 c) transforming the data from the abstract notation to a selected platform notation corresponding to the selected components; and
 d) generating the central application containing the platform notation;
 wherein deployment of the central application monitors the communication of component data between the selected components.

According to a still further aspect of the present invention there is provided a computer program product for generating a central application module for deployment on a predetermined combination of selected components. The product comprises:
 a) a computer readable medium;
 b) an abstract notation description module stored on said computer readable medium for containing data for the central application module;
 c) an editor module coupled to the description module for entering a selected set of input parameters to provide the data;
 d) an application generator module coupled to said description module for transforming the data from the abstract notation to a selected platform notation corresponding to the selected components; and
 e) the central application module coupled to the generator module for receiving the selected platform notation;
 wherein the deployment of the central application module monitors the communication of component data between the selected components.

BRIEF DESCRIPTION OF THE DRAWINGS

These and other features of the preferred embodiments of the invention will become more apparent in the following detailed description in which reference is made to the appended drawings by way of example only, wherein:

FIG. 11 is an example deployment of the system of FIG. 1;

DESCRIPTION OF THE PREFERRED EMBODIMENTS

Figure 1:
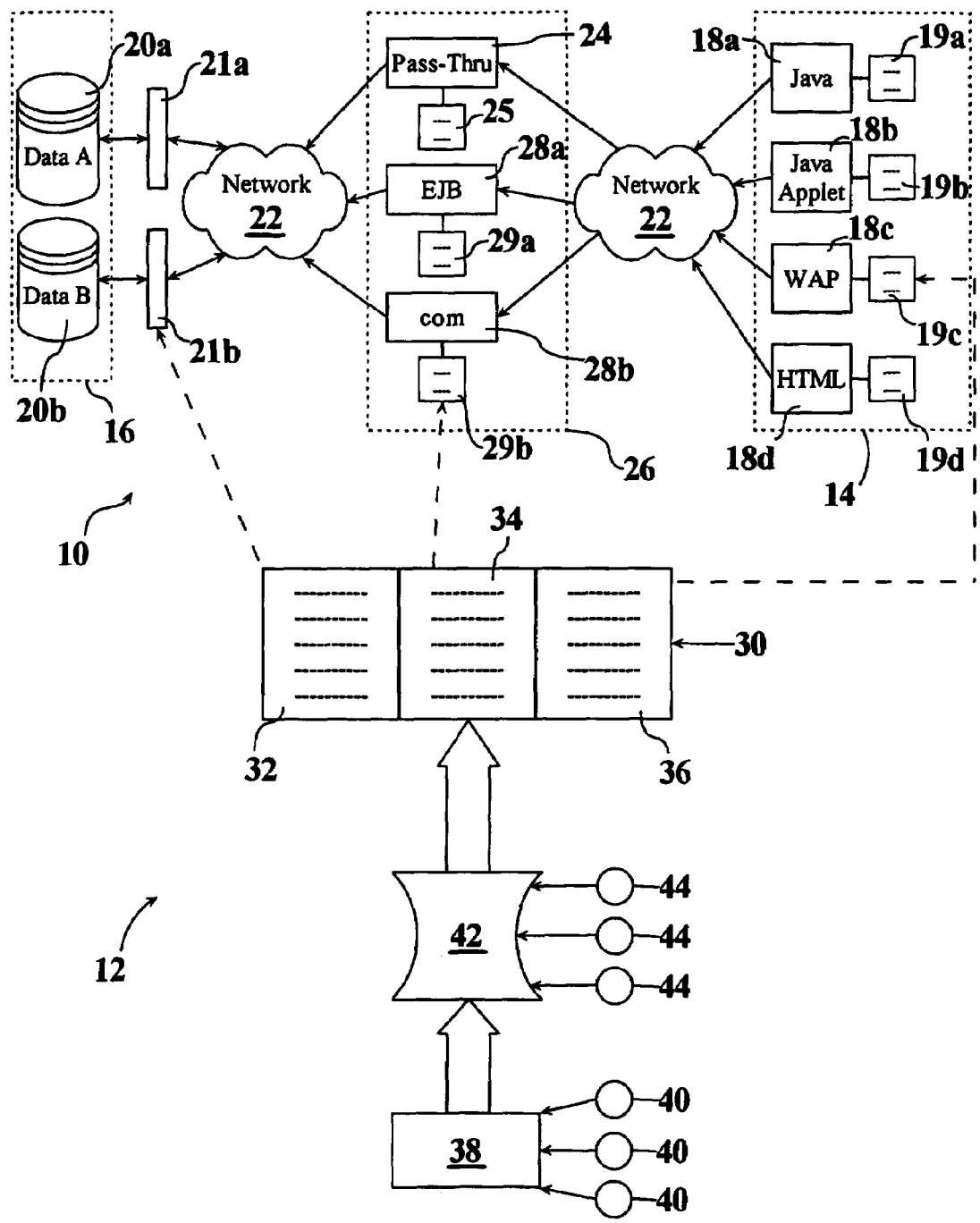
FIG. 1 is a block diagram for an abstract notation architecture system.

Referring to FIG. 1, a general n-tier application system 10 consists of a first tier 14 comprising a client side system or user interface 18 for interacting with an end tier system 16, in this case a third tier, comprising a data source 20a, b for the storage and retrieval of data. The user interface tier 14 is the visible part of the system 10 that can be manipulated by the user, generally involving the entering and displaying of data. The user can thereby manipulate multi media files through the interface 18, and can also upload, download, view, or otherwise manipulate the files contained in the databases 20a, b. Accordingly, the end tier 16 can be used to store user critical data on a long term basis for intermittent or continuous retrieval by the user through the user interface tier 14. Database access or user interface devices 18 of the tier 14 can include various data communication devices, such as but not limited to desktops 18a, applets 18b, 18d, wireless hand held devices 18c, mobile computers, pagers, and other PDAs for accessing the data sources 20a, 20b located in the end tier 16. It should be noted that each of the access devices 18 uses a corresponding device platform or software 19a, b, c, d for coordinating the access of the device or user interface 18a, b, c, d with the selected data source 20a, 20b. The data sources 20a, 20b each use a corresponding communication protocol 21a, 21b for coordinating the entering and retrieval of their data through a network 22 accessible by the first tier 14. The network 22 can be comprised of local area networks or global area networks such as the Internet. Examples of some of the networks 22 can include synchronous optical networks (SONET), synchronous digital hierarchy (SDH), a synchronous transfer mode (ATM) networks, microwave and antenna bay stations, satellite networks, and networks comprising a mixture of these technologies. Furthermore, the networks 22 can include such things as routers, or other interconnected segments that range from copper wire to fiber optic cable to microwave links.

The application system 10 can consist of the two tiers 14, 16 as described above, whereby the network 22 would be essentially a single network using a pass through system 24. This system 24 can provide direct data architecture to the system 10 to help provide high speed data access with reduced system 10 complexity and cost. However, a middle tier 26 can be added to the system 10 for providing predetermined business logic and addressing security and scalability concerns of the system 10. Accordingly, the middle tier 26 can be used to focus on the programming of business logic and to provide for scalability and security requires as the system 10 is adapted to changing needs. One subset of the middle tier 26 is the pass through architecture 24 for implementing a two tier 14–16 application model 10. Other components in the middle tier 26 can include middle ware applications or servers 28a, b, which can include such as but not limited to a Component Object Model (COM) and Enterprise Java Beans (EJB). These middle ware components 28a, b function by helping to hide details of running multiple transactions from the first tier 14, as well as managing and pooling resources to address performance issues, such as scalability, dynamic load balancing, and failover capabilities. Accordingly, the middle ware components 28a, b can scale the ability of the system 10 to meet growing demands, distribute and balance processing capabilities between servers, and reroute capabilities should selected servers cease to function. The middle tier 26 is situated between two networks 22 to facilitate the implementation of the middle ware processes between the first tier 14 and end tier 16. It should be noted that each of the middle tier 26 components 24, 28a, b includes a selected platform or software 25, 29a, 29b for coordinating the distribution of the data 20a, b from the end tier 16 to the device 18 of the first tier 14. It should be noted that the platforms 19a, b, c, d, 21a, b, 25, and 29a, b can use differing languages and protocol structures.

The various platform components 19a, b, c, d, 21a, b, 25, and 29a, b are provided by a central platform application 30, which is generated by an application development system 12. The system 12 can generate the application 30 for a variety of platforms, such as a series of graphical user interfaces connected to selected databases 20a, b. The central application 30 can contain a series of sub-applications 32, 34, 36 which may or may not be in the same programming language or customized for the same software platform or common hardware systems 18, 28, 20, thereby helping to provide an end-to-end n-tier application 30. Accordingly, the central application 30 provides the series of sub-applications 32, 34, 36 to be deployed on various tiers 14, 16, 26 for providing support for a selected combination of components contained in the tiers 14, 16, 26, which can be used by a company to integrate the selected components from the tiers 14, 16, 26 into one working solution on a variety of platforms. The sub-applications 32, 34, 36 are developed to provide the platforms 21a, b, 25, 29a, b, and 19a, b, c, d respectively. The system 12 contains a central or abstract application description file 38 constructed using a series of input parameters 40, which is then directed into an application generator 42, which operates on a series of selected inputs 44 containing particulars about the selected combination of components from the tiers 14, 16, 26 of the system 10. The file 38 can represent an abstract declaration of a graphical user interface for deployment on the device 18. The application generator 42 constructs the sub-applications 32, 34, 36 of the central application platform 30, based on the file 38, thereby providing a predetermined combination of platforms 19a, b, c, d, 21a, b, 25, and 29a, b to facilitate the access of a particular device 18 in tier 14, through the networks 22 and selected middle ware components 24, 28 of the middle tier 26, through to the selected databases 20a, b of the end tier 16. Accordingly, the user of a particular device 18 can then retrieve data from the databases 20a, b review, modify or alter the data, and then save the changes to the original or alternate selected database 20a, b. It should be noted that the generator 42 can generate multiple versions of the file 38 to be applied to a variety of hardware components in the tiers 14, 16, 26, which is represented by the subprograms 32, 34, 36 of the application 30. Accordingly, the file 38 can be designed to provide a similar look and feel to the user of various devices 18 across the various hardware software platforms, such as but not limited to HTML for browser and WAP for hand helds.

Figure 2:
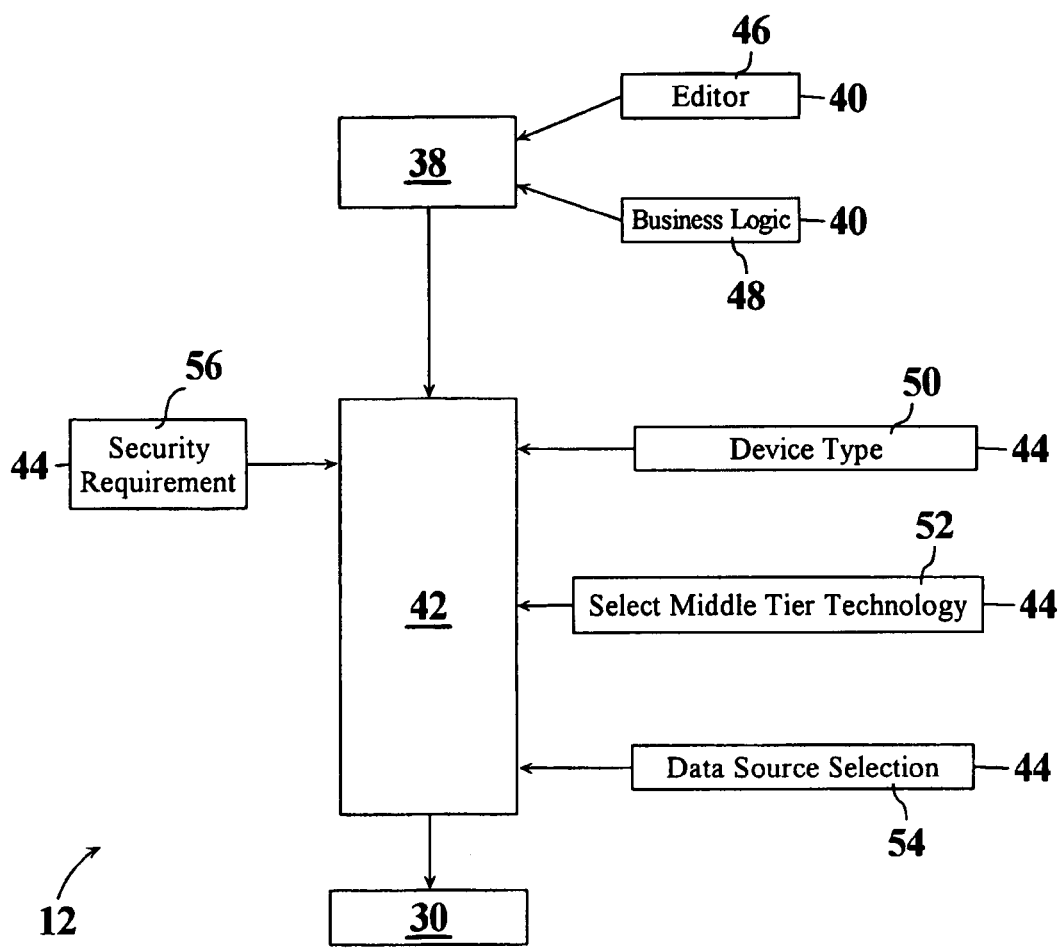
FIG. 2 is a block diagram of the application development system of FIG. 1.

Referring to FIG. 2, the system 12 is used to generate the central platform application 30 from the abstract language input file 38. The file 38 is then separated across the several related output files 32, 34, 36, thereby providing database interface platforms 21a,b, application server platform files 25, 29a, b and user interface platform files 19a, b, c, d. It should be noted that each of these platform files 19a, b, c, d, 21a, b, 25, and 29a, b can be generated in a different language for a pre-selected deployment combination (see FIG. 11 and corresponding description below). The input parameters 40 to the application file 38 can include designing of the application using an application editor 46. The application editor 46 facilitates the input of declarations into the file 38, as well as previewing previously entered declarations. Preferably, these declarations are stored in an XML format. Furthermore, internationalized strings can be added for functionality in multiple languages. The parameters 40 can include the addition of application business logic 48, including such things as neurons and reports to provide predetermined functionality to the central application platform 30. The neurons are an application of event based architecture and can be used to provide architecture that receives interprets, and sends messages. The neurons facilitate the specification of arbitrary behaviors for the platform 30 and are preferably programmed in the XML format. The reports and associated recursive report style queries of the business logic 48 allow manipulation and access to summary data, such as reporting via parent/child relationships of the data on the databases 20,a b.

The parameters 44 can include selection of a client or device type 50, which indicates the device type 18a, b, c, d accordingly. If the device type needs change, thereby requiring a new interface, the application designer can change the device type independently the other input parameters 40, 44. The parameters 44 can include a selection of middle tier technology 52, which facilitates the separation of business logic of the application presiding in the middle tier 26 from the functionality of the interfaces in the first tier 14. Security, scalability, and reliability parameters can be designed into the application 30 using these input parameters 52. For example, the parameter 52 can include specifications for middle tier architectures comprising EJB and COM, whereby communication with the middle tier 26 can be achieved by using Simply Object Access Protocols (SOAP) or the pass through parameters 24 can be designed thereby providing a traditional client-server two-tier architectural model. The parameters 44 can also include a data source selection 54 or the construction for a customized data source. The data storage tier 16 is were the data sources 20*a*, *b* are located. These databases 20*a*, *b* can be an SQL-compliant database such as the SQL server 7, Sybase adaptive server, or MySQL, as well as a variety of non-SQL data sources such as flat files, Legacy databases, and XML.

Further input parameter 44 can be security requirements 56, which can be based on multiple levels of security to provide a predetermined safety level of access to and from the data sources 20*a*, *b*. These parameters 56 can provide high level concurrency control, insulation of databases 20*a*, *b* behind corporate firewalls, and query security models for specification of clearance levels by the client company. Example aspects of the security parameters 56 can include user level security, web security, data security, and an application service provider (ASP) model compliance. Furthermore, industry standard 128 bit or higher Secure Socket Layer (SSL) encryption can be used. It should be noted that the input of the parameters 40, 44 is not limited to the corresponding specific input destinations 38, 42 as described above. Accordingly, alternate combinations of input parameters 40, 44 to either the file 38 or the generator 42, or other combinations thereof can be used by the system 12, depending upon the needs of the software developer to generate the central platform file 30. Accordingly, once the generator 42 has generated a source code file 30 for a selected component combination of inputs 40,44 representing the entities contained in the tiers 14, 16, 26, the file 30 can then be passed to a specific language compiler, such as Java or C based, to build an executable code. It should be noted that this computation stage could also be accommodated by the generator 42, thereby providing an executable application file 30 for deployment on a selected configuration of the n-tier application system 10.

End Tier Systems

The data source selection parameters 54 of the input parameters 44 can be used to define the particular selected protocol platform 21*a*, *b*, as described by the sub-application file 32 of the central application platform file 30. The data sources 20*a*, *b* and associated protocols 21*a*, *b* can be selected from any system that can be used to store data from which a predetermined access level is monitored. The most common types of data sources 20*a*, *b* are based on Structure Query Language (SQL), commonly referred as SQL sources. These sources can include MySQL which is an open source software that can be used as a readily available database management system, of which the source code can be download, used, and modified to fit the individual needs of the user. Another SQL source is SQL Server 7, which can be used to interact with the Microsoft COM objects and other Microsoft based technologies. Sybase is a further data source 20*a*, *b* providing a custom query system typically used in high end database solutions that are designed on unique bases. Furthermore, a Freedom Intelligence 20*a*, *b* source can be used as a read only database solution that can be optimized for executing SQL queries.

In addition to SQL based databases 20*a*, *b*, the software development system 12 can also support a variety of non-SQL sources involving custom query systems, such as but not limited to flat-files, Legacy databases, and extensible markup language (XML). The flat files can represent a database, tree, or network structure such as a single file from which the structure can implicitly be rebuilt and modified. Legacy databases 20*a*, *b* are commonly known in the art, and typically represent older and highly customized data sources 20*a*, *b*. The system 12 can also utilize XML as a data source 20*a*, *b* by presenting data in a corresponding database structure.

Tradition storage values for databases 20*a*, *b* can include numbers and strings. A Binary Large Object (BLOB) specification, which can be found in SQL 92, further enables the storage of images, sound, video, and any other form of computer media in a database. Accordingly, the system 12 can also use a BLOB column to hold an arbitrary string of bits. For example, BLOBs can be used to store a variety of file types, including multi media files and images, whereby all these elements are stored in the selected database 20*a*, *b*. Accordingly, web pages can be generated from a series of elements stored on the database 20*a*, *b*, including such data as an author, price, picture of a book cover, summaries, and customer reviews, such as for an application 30 for database access system 10 of an online book store. BLOBs can also be used to build document management systems, such as storing documents in the database 20*a*, *b* so that various individuals can share the materials contained therein. Furthermore, BLOBs can also be applied to facilitate the storage of CAD diagrams and other imagery data. The use of BLOBs can also be used to handle BLOB files of unknown types by writing custom entities to view custom file types by the devices 18 of the system 10.

Security Components

Figure 6:
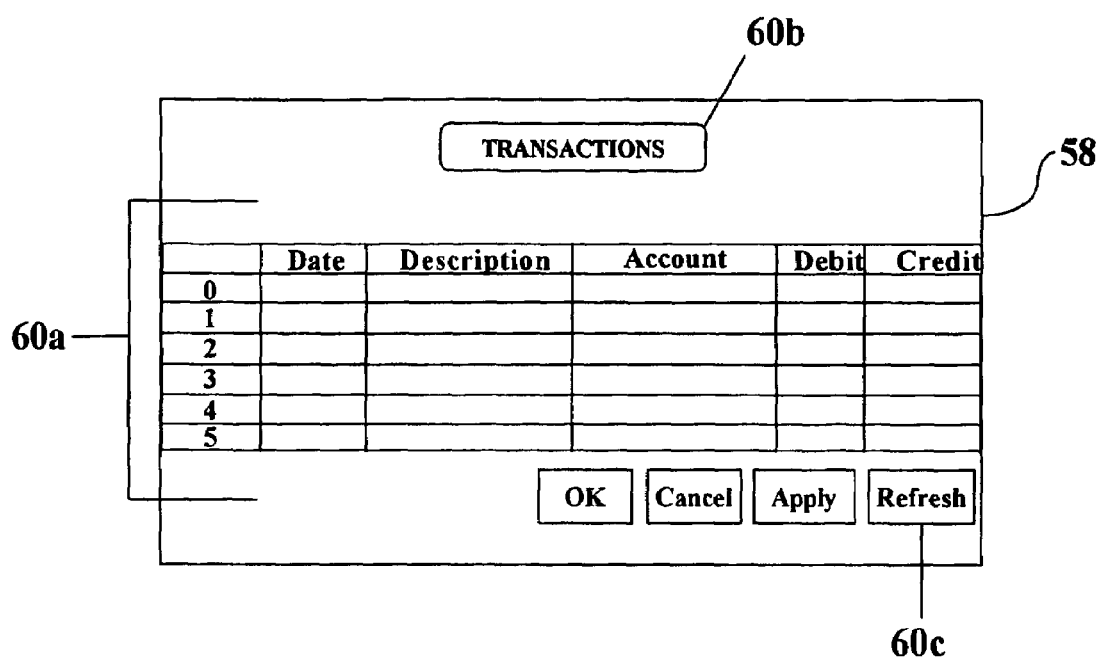
FIG. 6 is a sample interface of the system of FIG. 1.

The security requirement parameters 56 of the input parameters 44 can be used to monitor the passing of private and confidential information, such as but not limited to credit card numbers, personal addresses, and phone numbers, as monitored by the central application 30 for the associated tiers 14, 16, 26 and devices therein of the system 10. The parameters 56 can also be used to specify security settings for individual fields, tables, and other widgets 60 (see FIG. 6) used in the interface of the device 18. Since any advanced system 10 could potentially exhibit multiple instances of vulnerability, making such systems 10 containing elevated levels of complexity more prone to security holes. Accordingly, the parameters 56 could be used to specify user level security details, web security issues, and data security issues. Further to user level security, passwords could be assigned or login process on the device 18 to distinguish different users having different data access levels. Pre-existing queries could be specified to execute based on the security clearance granted to each individual user, which would allow the user to view and modify confidential data on the databases 20*a*, *b* while inhibiting other non-associated users from having the same accessibility. The web security can use 128 bit or higher Secure Sockets Layer (SSL) encryption to provide secure access to data over the Internet 22. Accordingly, example applications 30 such as those based on JAVA Server Pages (JSP) platform can be used in connection with the SSL security standard (see example application as detailed below). The data security can be used to address such issues as the use of firewalls and the use of encryption between entities such as database servers 28*a*, *b*.

In addition, the Application Service Provider (ASP) system model can generate specific security concerns. Accordingly, a User/Company/Application security model can be used to provide the separation of individual client data from one another. This model can include the parameters 56 such that each user belongs to a single company and each company has a separate database 20a, b. When a particular user (belonging to a particular company) logs into an application using the device 18, the user is given access to the companies database 20a, b as specified in the central application platform 30. If the company has access to multiple applications, then the data 20a, b for every application can be shared, facilitating intra operability between applications. It should be noted that the data security parameters 56 can be used to specify security requirements in two tier architectural models where the device 18 can access the database 20a, b directly, or in middle or multiple tier architectural models which makes use of the middle tier 26 and transaction servers 28a, b. Accordingly, the security features of the application platform 30 can reside in any one of the sub-application platform files 32, 34, 36, depending upon the desires of the company and design parameters 40, 44 designated by the software designer during construction of the central platform application 30.

The security parameters 56 can be setup to determine that once a login has occurred through the interface of the device 18, the user name supplied is used to lookup the appropriate handle for the user. As well, the application name is used to fetch the appropriate handle for the selected database 20a,b access desired. The user handle and application id can then used to fetch the correct group for security permission lookup for each entity listed in the application 30. Security permissions that are fetched are then applied to all entities in the program 30, determining what buttons, screens, etc. the user can view, as well as what text fields, grids, etc. the user can modify. As well, the user handle and the application id are further used to fetch any customized settings the user may have in the system 10, as defined by the central platform application 30, such as screen color, etc.

Figure 3:
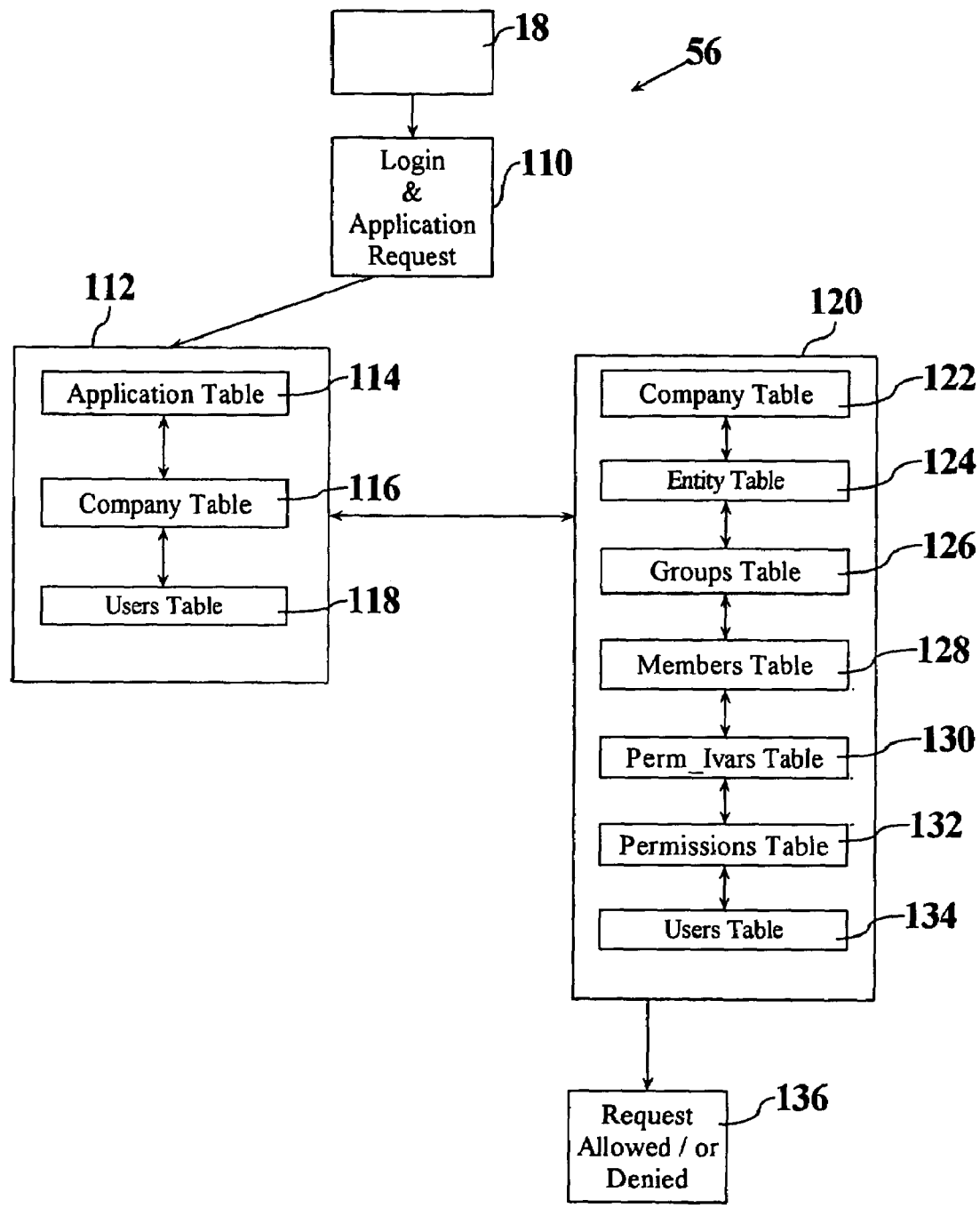
FIG. 3 is a diagram of parameters of the system of FIG. 2.

Referring to FIG. 3, the parameters 56 can be used to monitor a login and application access request 110. This request 110 would query a Login Database 112, consisting of an Application Table 114 containing a handle Field that references the application 30, the application owner Field that holds which company actually has permission to use this application 30, and the application name Field which holds the actual name of the application 30. The database 112 also contains a Company Table 116 containing a list of all companies which have data accessible by a particular server 28, the companies handle for locating in other tables, and who the company owner is, represented by a handle Field for referencing the company for lookup, a comp owner Field for indicating who the owner of the company is, with respect to a Users Table 118, and a comp name Field which holds the actual name of the company. The Users table 118 contains a list of all users 18 who may log into the Application 30 running on the system 10, their passwords, their handle for locating in other tables, and what company the user 18 belongs to in the following fields, such as a handle Field that references the user 18 for lookup, a user password Field that holds the actual password for the user 18, a user company Field for referencing which company the user 18 belongs to via the company table 116, and a user name Field that holds the actual user name.

Accordingly, when a user 18 logs into the application 30, their password is checked on the server 28 under the login database 112 in the users table 118. The users table 118 contains a reference to the person's company, which is then used to see if the user 18 has permission to use that program 30, via the application owner field of the application table 114. For instance if Company A has this application 30, they don't want the user 18 in their rival Company B to be able to log into their own separate system 10. Further, the company table 116 in the login database 112 is also used to determine which security database 120 to use to get the application's 30 permissions.

For example, the security database 120 can include a Company Table 122 containing a list of all companies which access to the data 20a,b by the selected server 28a,b, their handle for locating in other tables, and who the company owner is, as described above with reference to table 116. The database 120 also includes an Entity Table 124 containing a list of all entities which exist for all applications 30 that have been initialized on the companies system 10. The entity table 124 contains a handle Field for referencing the entity for lookup by other tables in the database, an id Field that contains the actual id given to the entity, an application Field that distinguishes between entities that belong to different applications 30, so that entities can be identically named for completely different applications 30 with different security ratings, an owner Field that determines which user 18 may modify an entity's security settings, and a type Field that contains a reference to what type of object the entity is, be it an Application, Screen, Image, Grid, Field, etc.

The data base 120 also contains a Groups Table 126 that holds all available groups which may have security settings provided by entities, and contains a handle Field that references the group 126 for lookup by other tables in the database 120, a group name Field that holds the actual group name, a group owner Field that determines which user 18 may add or remove other users 18 from the group, or even delete the group, and a group application Field that determines which application 30 this group is for. The database 120 also has a Members Table 128, which sets the memberships for each group, based on the entries from users 134, groups 126 and application tables 114. The members table 128 contains a handle Field that references the member for lookup by other tables in the database 120, a mem group id Field that indicates what group the member belongs to, through groups table 126, a mem application id Field that indicates what application 30 this specific member entry is for, through the application table 114, and a mem user id Field that holds what the member's user id is through users table 134.

The database 120 also can have a Perm Ivars Table 130 that holds any customized user settings for the application 30 by references to a user ID Field that holds a reference to the user table's handle field to reference the proper user 18, a name Field that holds the name of the Permanent Ivar, and a value Field that holds the value the Ivar is to take on when the application 30 loads. The data base 120 also has a Permissions Table 132 that holds what permissions each entity has based on the application 30 and the group id by referencing a handle Field that references the group permission number for lookup by other tables in the database 120, an entity name Field that holds the entity name that these permissions are for, a per application id Field that holds which application 30 the entity belongs to, via the application table 114, a per group id Field that holds which group these permissions are for via the groups table 126, a permission add Field that holds whether or not the group has permission to add to the entity, True or False, a permission del Field that holds whether or not the group has permission to delete from the entity, True or False, a permission write Field that holds whether or not the group has permission to write to the entity, True or False, and a permission read Field that holds whether or not the group has permission to read from the entity, True or False. The database 120 can also have a Users Table 134, as described above with reference to table 118.

Accordingly, once the request 110 have caused the system 10, according to the application 30, to process the request 110 according to the databases 112, 120, the request 110 is either allowed with appropriate permissions 136, or is denied. If the request 110 is allowed, then the security settings come back from the respective server 28 according to the application 30 and the login message is sent to all corresponding entities of the application 30. Once a entity receives the login message, it checks it's security on creation and whenever the user 18 logs in. If an entity passes security, its visibility is set to true for the interface of the device 18, or otherwise false (invisible). The application security can be based on a particular entity, the group to which the current user 18 belongs to and the application 30. The final security for an entity is a union of all securities that fit the entity/group/application combination, as determined by the particular application 30 operating on the system 10 for a selected combination of components contained in the tiers 14, 16, 26 concerned.

Middle Tier Technology

The middle tier 26 technology of the system 10 can be provided in the central platform application 30 by use of the middle tier parameters 52. For example purposes, such as but not limited to, three middle tier 26 architectures can be supported by the central platform application 30 are Pass Through 24, EJB 28a, and Component Object Model 28b. Set up and implementation of the middle tier 26 components in the central platform application 30 can facilitate hiding details of running multiple transactions from users, as well as managing and pooling resources, to optimize system resources as well as scalability, reliability, and security.

The Component Object Model Architecture 28b and associated operating platform 29b helps devices 18 to make remote procedure calls and invoke services provided by COM-compliant components, whereby the COM standard of component interoperability and reusability enables software developers to build highly distributed systems by assembling reusable components from different software vendors. The COM standard also provides mechanisms for management of shared memory between components, whereby the devices 18 can request a COM object of a specified type. The COM implementations can pool COM objects and return these pooled objects to requesting devices, whereby when a device is finished using a particular requested object the instance it is returned to the pool. Accordingly, the parameters 52 concerning business logic and database queries can be expressed in the abstract notation of the file 30, such as XML format, to be used to generate COM objects that reside on the COM server 28b. These COM objects can interact with other customized, client specific COM objects as required to meet client needs.

Figure 4:
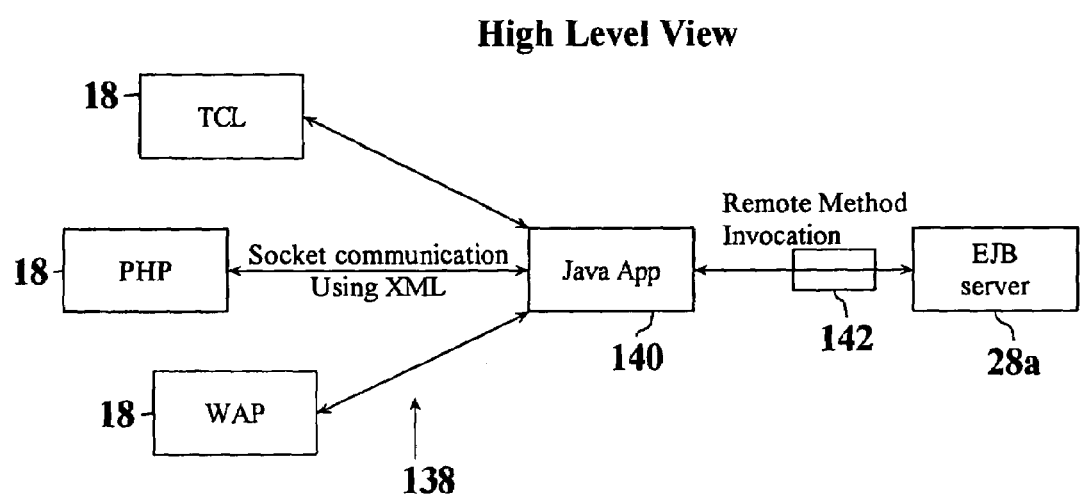
FIG. 4 is a middle ware component of FIG. 1.
Figure 5:
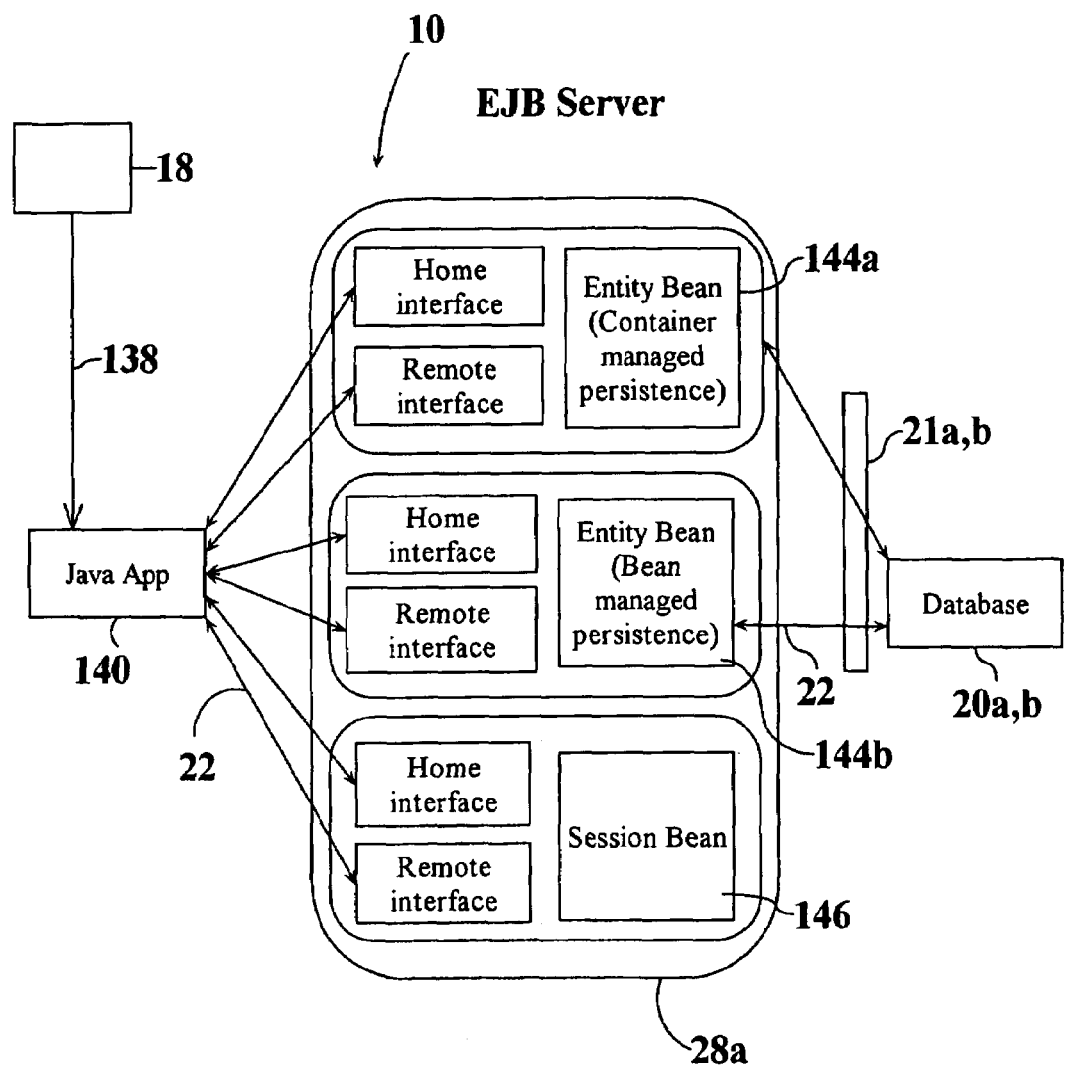
FIG. 5 is a further middle ware component of FIG. 1.

The parameters 52 can also be used to specify operational behavior of EJB server 28a and associated platform file 29a. EJBs are components written in the JAVA programming language, which can be run on any platform and operating system that supports the EJB standard, thereby facilitating the program designer to focus on the business logic of the application 30 and minimizing regard to server specific complications. Referring to FIG. 4, the client devices 18 communicate with the back-end of the architecture of the sever 28a by using sockets and XML as the communication medium 138, which is directed to an intermediate level Java application 140. This application 140 interprets XML sent to it from the client level applications 18 into RMI calls 142 and forwards these on to the EJB server 28a. Referring to FIG. 5, the EJB Server 28a comprises entity beans 144a,b and session beans 146. It should be noted that the entity beans 144b has persistence managed by the bean, and the entity beans 144a in which persistence is managed by the container. The bean 144b itself is responsible for making JDBC calls to the database 20a,b to implement necessary database functionality though the corresponding interface 21a,b. The entity bean 144a makes less complex calls to the container and the container takes care of low level details of database 20a,b access. Accordingly, EJB servers 28a can be programmed to handle underlying transaction management details. The system 12 can be programmed by the parameters 52 to generate EJBs 28a from the abstract notation description of the application 30, thereby providing such middle tier 26 services as transactions, security, database connectivity, threading, and persistence.

Further parameters 52 can be used to implement platform independent techniques for call procedures to objects across diversely distributed systems, as well as the ability to pass through corporate firewalls in order to transmit data obtained or returned to the data sources 20a, b. Accordingly, parameters 52 defining the Simply Object Access Protocol (SOAP) can be used to specify functions under the "request/response" message model. The parameters 52 can include information on Remote Procedure Calls (RPC), which can be serialized into SOAP messages defining the call parameters. A further parameter 52 can include information on the interpretation of SOAP messages by a server capable of remitting objects, as well as calls on a "session Object" to execute the actual procedure code to return the desired value. This value can be serialized into the SOAP message and then sent back to the client side, where it is then deserialized. Accordingly, the parameters 52 are used in the application 30 to help define the call procedures as well as the pass parameters used with the call procedures. Furthermore, SOAP messages containing error values (if the desired procedure is not successfully implemented) can also be included, so that the platforms 29a, 29b can be used to define structures to return requested values, as well as error values. These parameters help the systems of the middle tier 26 to become distributed and to facilitate the full accessibility of shared objects. Further parameters 52 can include instructions for transporting XML documents through HTTP, thereby providing for SOAP messages that are understood by application supporting the technologies of both HTTP and XML.

Implementation of the business logic on the middle tier 26 can be facilitated by the use of neurons and reports, as the system 12 is built upon a fully message-based architecture. Preferably the neurons can be implemented in the first tier 14. Visual elements on the client 18 such as buttons generate and respond to messages over the network 22 when users interact with them. Some examples of these messages for database 20a,b interaction can include: a window closing when a user clicks the "close" button, a row being selected when a user clicks on a row of a grid, and an input box changing when a user enters a value and clicks the "change" button. This messaging system incorporated in the application 30 yields an event-driven architecture, which facilitates the development of behaviors in the applications 30. These messages are sent on distinct channels to the central server 28a,b location, which coordinates the distribution of messages. The central system 28a,b distributes the messages to every listener device 18 that is listening to the channel over the network 22 on which the message is being sent. Relaying all of an application's 30 messages to the central system 28a,b facilitates the customization and interaction with the application's 30 behavior.

Certain applications 30 use "Neurons" for complicated behaviors, which are preferably implemented in the first tier 14 business logic. Neurons are an abstract concept that can be defined as something that receives, interprets, and sends messages for the system 10 over the network 22. In the case of implementation of neurons on the first tier 14, the neurons send messages within the platform 19a, b, c, d of the devices 18a, b, c, d. Neurons are programmatic in Extensible Markup Language (XML) but can be coded in Java for intricate and or user-specific behaviors, for insertion into the file 38 and/or generator 42 to produce the central application platform 30. Neurons permit the specification of arbitrary behaviors.

EXAMPLE XML

```
01   <entity ID="set_date_neuron" type="Neuron">
02       <param name="in">
03           <channel>WidgetStatus.comm</channel>
04       </param>
05       <param name="middle">
06           <waitfor>
07               <condition paramname="action" >"loaded"</condition>
08               <condition paramname="type" >"WidgetStatus"</condition>
09               <condition paramname="id" >"title_screen"</condition>
10               <create var="date" />
11               <getglobal var="date" ivar=".date" />
12               <setglobal
                       var=".main.title_screen.grid.label.current_date"> $date
13               </setglobal>
14               <java>
15                   insert java code into generated code here
16               </java>
17           </waitfor>
18       </param>
19   </entity>
```

The example XML above represents the neuron that acts to set a date within an application when executed. Neurons listen to specific channels over the network 22, or within platform 19 depending on the tier 14, 26 used, for the instruction to execute their body code. The Line 03 illustrates that this neuron is listening to the channel "WidgetStatus.comm.". Any message sent across this channel will trigger this neuron to execute its body code. The body code of a neuron is encapsulated within "<waitfor>" tags (Lines 06 through 18). Before executing this body code, the neuron will check to ensure that certain conditions have been met. These conditions can be found on Lines 07 through 09. The first condition (Line 07) relates to the action that must have occurred to trigger this neuron. This condition will check to ensure that the neuron was triggered by an "action" of type "loaded". Recalling that users on the client side trigger neurons, some other examples of "action" conditions include: a grid being "opened", a button being "clicked", or in this case, a screen being "loaded".

The second condition (Line 08) relates to the type of message that triggers this neuron across the "WidgetStatus.comm." channel. Line 08 specifies that the message must be of type "WidgetStatus". The third condition (Line 09) relates to the origin of the message that triggers this neuron. This condition will check to ensure that the neuron was triggered by a "title_screen" widget. When all of the above conditions have been met, this neuron will create a variable called "date" (Line 10) and assign it the value stored in the Intelligent Variable (IVar) ".date". IVar's are generally variables that hold data within widgets of an application. IVars such as ".date" and ".time" are unique IVars because they are derived from the system and not from widgets of an application. When executed, Line 11 will retrieve the current date from the system and assign this value to previously declared variable known as "date". Line 12 makes use of an anchor to set a label widget within a screen of an application to display the current date. To accomplish this, the "date" variable that now stores the current date must replace an existing variable within the label widget. The existing variable within the label widget is accessed by the use of an anchor, which essentially acts as a hierarchal reference. This anchor in this particular example is ".main.title_screen.grid.label.current_date". Accordingly, highly specialized behaviors can be implemented for highly customized software solutions 30 by inserting native Java code into the body of the neuron. Lines 14 through 16 demonstrate how we insert native Java Code into generated code. Choosing to do so, however, can remove platform independence.

A further construct to implement the business logic of the middle tier 26 are Reports, of which the functionality of Neurons is quite similar. The Reports of the application 30 facilitate presentable documentation with regards to data-centric software applications 30. Reports contain application server business logic. Reports are useful for data processing and global calculations. A report could be used to create, such as but not limited to, a balance sheet, income statement, or post transactions to a series of accounts. Reports are specified using a similar Document Type Definition (DTD) to that used by Neurons.

EXAMPLE XML

```
01  <entity ID="Example_Report" type="Report">
02      <param name="name">this is a report</param>
03      <param name="code">
04          <report>
05              <reportmain>
06                  <body>
07                      <center>this is an example report</center>
08                      <create var="p1"/>
09                      <set var="p1">-1</set>
10                      p1 = <get var="p1" />
11                      <include file="layout.xml"/>
12                      _____
13                      <pp>
14                          <image source=". . ./image/ariussoftware.gif"/>
15                          <item>Insert Data 1</item>
16                          <item left="10" top="10">
17                              Insert Data 2
18                          </item>
19                          <item left="10" top="30" width="10">
20                              Insert Data 3
21                          </item>
22                          <item left="200" top="40" height="300">
23                              <image source=". . ./image/custom_picture.gif"/>
24                          </item>
25                      </pp>
26                      _____
27                  </body>
28              </reportmain>
29          </report>
30      </param>
31  </entity>
```

The example XML above represents Report entities are defined in the XML descriptions 38. Multiple reports that use similar layout and presentation properties can reference an external XML file to handle these similarities. This feature is displayed in Line 11. Line 07 illustrates one of the layout and presentation tags that are used in reports. The <center> tag is used to center align data. Lines 08 through 10 highlight our ability to use Intelligent Variables (IVars) in our reports. IVars can be used by queries to retrieve data from the database 20a,b for the purpose of generating reports. Lines 14 and 23 highlight how images can be inserted into our reports to enhance the visual appeal. Line 13 contains the tag "<pp>", which stands for Precise positioning. Business data can be inserted in Lines 17, 19, and 22. The <item> tags encapsulating these lines are used to define layout properties for precise positioning.

Accordingly, as discussed above, Reports are written within file 38 under Report entity, under the param named-"code". Neurons are also written in the file 38 under the Neuron entity, but it does not have a param named"code". Neurons and Reports share a lot of functionality between them. Reports are used to create visual pages, where Neurons are used to help with functionality.

Example components of reports can include:
<entity ID="ReportId" type="Report">
<param name="name">Report Eg</param>
<param name="width">800</param>
<param name="code">
<report>
<reportmain>
<header>
<font size="4">Report Eg</font>
<break/>
</header>
<body>
<table border="0">
<row>
<cell>Cell1</cell>
<cell>Cell2</cell>
</row>
</table>
</body>
</reportmain>
</report>
</param>
</entity>

Explanations of the above components are:
Report
A tag for when dealing with a report entity under param named "code".
Reportmain
Indicates the location of the main processing loop.
Include
This tag is used to read in data from a file. If the file exists, and its contents can be read, the contents of the file are outputted in place of the tag. The file attribute specifies the file to be included. The file must have the correct report syntax. E.g. <include file="Name of File"/>
Header
This tag is used at the beginning of a report. The header text between the opening and closing tags is used to display the report title. Fonts and layout tags may be used as well in between the header tags.
Body
This tag is usually inserted after the header tag. The text between the opening and closing body tags will be the majority of the report. Almost everything you want displayed can go here.

Footer

This tag is much like the header or body, except this tag is used at the bottom of the report and will follow the closing body tag. Text between the opening and closing tags will be displayed at the bottom of the report. Font and layout tags may be used as well in between the footer tags.
E.g. <header>
... Display Header Info ...
</header>
<body>
...
.... Body of Report ...
...
</body>
<footer>
... Display Footer Info ...
</footer>

Left, Center, Right

These tags are used to align whatever is in between the opening and closing tags. Alignment is relative to the page.

Bold, Italic, Underline

These tags will format whatever text is in between their opening and closing tags.

Table

This tag will define a table, much like that of an HTML table. The border attribute is assigned an interger that will define the thickness of the border. The width attribute is assigned an integer that will define the width of the table, as similarity the height attribute describes the height of the table.

Row

This tag belongs between the table tags. The row tag defines a single row in the table. For every set of opening and closing row tags, one row exists in the table. The tag has a height attribute that is assigned an integer.

Cell

This tag belongs between the row tags. The cell tag defines one cell in the table. If there were twenty opening and closing cell tags between any row tags, then the table would have twenty columns. This tag has a width attribute that is assigned an integer.

Font

The font tag is used on text. Whatever text is between the opening and closing font tags will be affected. The font attributes are name—font name, size—size of font, and color—color of font.

Image

This tag allows the insertion of images into Reports. It has a source attribute, which is assigned a string containing the location of the image. Width and height attributes both take on integers describing the width and height of the image.

Margin

This tag allows us to set margins for the Header, Body, and Footer. The tag must be contained in the desired section or sections. Margin tags have attributes left, right, top, and bottom, which set distance from the sides of the page.

Break

This tag will simply move to a new line in the Report.

PP

This 'precise positioning' tag will define an area where items will be inserted. Width and height attributes describe the width and height of the area.

Item

These tags are used between the opening and closing pp tags. Item tags are used to surround text, images, etc. Attributes xloc and yloc describe the location of an item relative to the top left corner of the pp tag. Width and height are used as well to describe the width and height for the item. At runtime, if width or height of an item has gone over the pp tag's boundaries, the pp tag will expand to fit all the items.

There can be tags that are common to both Neurons and Reports, such as:

Funcdef

This tag requires attribute name which is the name of the function. Optional attributes type, used when the function has a return type, and var, the name of the variable that is returned in the function, are also available to use.
E.g. <funcdef name="hello">
<paramdef name="p1"/>
<paramdef name—"p2"/>
<code>
<if>'$p1' eq '1'</if>
...
<elseif>'$p2' eq '-1'</elseif>
...
<else/>
<if>true</if>
...
<endif/>
...
<endif/>
</code>
</funcdef>

Paramdef

Paramdef is used to define arguments for defined methods. Name, the name of the parameter, is the required attribute of this tag. An optional tag, type, is also used to define the parameter type. See the above example.

Funcuse

This tag is used to call a defined function. The name attribute is specified with the name of the defined function. An optional attribute, var, can equal the name of a variable that will take on the result of the function. E.g. Assume a function add is defined:
<create result/>
<funcuse name="add" var="result">
<paramuse name="p1">25</param>
<paramuse name="p2">10</param>
</funcuse>

The value in variable result will be 35.

Paramuse

This tag is used in conjucntion with the Funcuse tag to pass in arguments for a function. The attribute name specifies the paramter of the function. Take a look at the above example.

Java

Java code in between these two tags gets dropped directly into the generated code.

For

This tag is used to create a loop. It requires attributes var, start, end, inc, and compare to be set within the opening tag. Var can be set equal to the name of a variable, otherwise a variable with that name will be created. Var will be set to the value of start, so that each time through the loop, all statements between the opening and closing tags will execute, and var will be incremented by inc. This will continue until the value of var, compare, and end evaluates to false, where compare is an operator (see Conditional/Control Tags).
E.g. <for var="Var" start="Number" end="Num" inc="Num" compare="Oper">
... (Statements) ...

</for>

Squery

This tag is used to load an squery. The qname attribute defines the query name that is to be loaded.

E.g. <squery qname="Name"/>

Numcols

This tag is used to return the number of columns in an squery. Query name attribute qname, name of the query, and variable attribute var, name of the variable used to store the number of columns, must be specified within the tag.

E.g. <numcols qname="Name" var="Variable"/>

Numrows

This tag is used to return the number of rows in an squery. Query name attribute qname, name of the query, and variable attribute var, name of the variable used to store the number of rows, is be specified within the tag.

E.g. <numrows qname="Name" var="Variable"/>

Setrow

This tag is used to set the current row index in an squery. Query name attribute qname, and row attribute row is specified within the tag.

E.g. <setrow qname="Name" row="Number"/>

Getrow

This tag is used to return a row from an squery. Query name attribute qname, and variable attribute var, which holds the returned value, is specified within the tag.

E.g. <getrow qname="Name" var="Variable"/>

Setcell

This tag is used to set the value of the indexed cell. Query name attribute qname specifies the query name, rowindex attribute specifies the row number, colindex specifies the column number, and value attribute value is the value to which you want to set the cell.

E.g. <setcell qname="Name" rowindex="Number" colindex="Number" value="Val"/>

Getcell

This tag is used to get the value of an indexed cell. Query name attribute qname specifies the query name, rowindex attribute is used to specify the row number, colindex specifies the column number, and variable attribute var is the variable that the result will be put into.

E.g. <getcell qname="Name" rowindex="Number" colindex="Number" var="Var"/>

Deleterow

This tag is used to delete a row from an squery result set. Query name attribute qname, and row attribute row is specified.

E.g. <deleterow qname="Name" row="Number"/>

Addrow

This tag is used to add a blank row to an squery. Query name qname is specified within the tag.

E.g. <addrow qname="Name"/>

Sqsave

This tag is used to save an squery result set back to the database. Query name attribute qname is specified within the tag.

E.g. <sqsave qname="Name"/>

Create

This tag is used to create a variable. Within this tag, attribute var is followed by the variable name.

E.g. <create var="VariableName"/>

Set

This tag is used to set the value of a variable. Within this tag, attribute var is followed by the variable name. After closing the tag, follow it by the value for the variable. Note that a variable must be created before it can be set.

E.g. <set var="Age">23</set>

The above will set variable age to 23.

Get

This tag is used to get the value of a variable. Within this tag there is the attribute var followed by the variable name.

E.g. <create var="temp"/>
<set var="temp">Hello World!</set>
temp=<get var="temp"/>

The above should print out: temp=Hello World!

Initglobal

This tag is used to initialize a global variable. Within this tag there is the attribute var followed by the variable name.

E.g. <initglobal var="GlobalVarName"/>

Setglobal

This tag is used to set the value of a global variable. Within this tag there is the attribute var followed by the variable name. Then close the tag and follow it by the value for the global variable. Note that a global variable is initialized before it can be set.

E.g. <setglobal var="GlobalVarName">Value</setglobal>

Getglobal

This tag is used to get the value of a global variable and set a local variable to the result. Note to reference global varibles you load them into a local variable. Within this tag there is the attribute var followed by the local variable name and there is the attribute ivar followed by the global variable name.

E.g. <create var="TempLocalVar"/>
<getglobal var="TempLocalVar" ivar="GlobalVarName"/>

Example components of Neurons for first tier 14 or middle tier 26 can be:

<entity ID="sample_test_neuron" type="Neuron">
<param name="in">
<channel>channelA</channel>
</param>
<param name="middle">
<waitfor>
<condition paramname="mesgName">"Example"</condition>
<message mesgname="Name" type="Widget" channel="channelName"></message>
<setmessageparam mesgname="Name" param="colour">"blue"</setmessageparam>
<send message="Name"/>
</waitfor>
</param>
</entity>

Explanations of the above components are:

Sum

This tag will enable you to find the sum of a specified column in an squery. The attribute query is the name of the squery, the attribute table is the table name of the the column you would like to use, and of course the field is the name of the column to use.

E.g. <sum query="queryName" table="tableName" field="fieldName"/>

Avg

This tag will enable you to find the avgerage of a specified column in an squery. The attribute query is the name of the squery, the attribute table is the table name of the column you would like to use, and of course the field is the name of the column to use.

E.g. <avg query="queryName" table="tableName" field="fieldName"/>

Createmessage

These tags reside under the param named "middle" in a neuron entity. This tag will create a message that the neuron can later send on the specified channel. The attribute type is used to specify the type of message. The possible values for type are described under the Messaging System section. The msgname attribute is an textual name you may assign the message. The final two attributes specify which channel to send the message, but they differ slightly in functionality and only one of the two attributes must be specified. The channel attribute specifies what channel you want to send the message on, and when the message is sent it is sent to everone listening on that channel. The relative channel attribute differs slightly in that it will still send the massage on the specified channel, but only from a certain height in the tree. So, if we had two instances of a screen, this allows us to send messages only to other widgets on the same instance of a screen and not to both.

E.g. <entity ID="neuron_id" type="Neuron">
. . .
<param name="middle">
<createmessage type="messageType" msgname="messageA" channel="channelX"/>
<createmessage type="messageType" msgname="messageB" relativechannel="parent.channelX"/>
</param>
. . .
</entity>

Channel

These tags reside under the param named "in" in a neuron entity. The purpose of the channel tags is to specify which channels the neuron is to listen on. The name of the channel goes between the opening and closing channel tags.

E.g. <entity ID="neuron_id" type="Neuron">
<param name="in">
<channel>channelA</channel>
<channel>channelB</channel>
</param>
. . .
</entity>

Setmessageparam

These tags reside under the param named "middle" in a neuron entity. This tag allows you to add any user defined parameters to a message. The mesg-name attribute specifies the message that we are adding a parameter to. The param attribute specifies the name of the created parameter. The value of the parameter is enclosed between the opening and closing tags and between double quotes.

Send

These tags reside under the param named "middle" in a neuron entity. It sends a specified message using the message attribute to specify a message name.

E.g. <entity ID="neuron_id" type="Neuron">
. . .
<param name="middle">
<createmessage type="messageType" msgname="messageA" channel="channelX"/>
<setinessageparam mesgname="messageA" param="colour">"blue"</setmessageparam>
<send message="messageA"/>
</param>
. . .
</entity>

Getmessage

These tags reside under the param named "middle" in a neuron entity. The getmessage tag takes the message that fired the neuron and creates a specified variable that it is put into. The mesgname attribute is the name of the variable to be created and for the message to be inserted into. The creation of this variable will then allow the user to read message information.

Getmessageparam

These tags reside under the param named "middle" in a neuron entity. The getmessageparam tag will read a specified parameter from a specified message and create a given variable and insert the parameter value into the created variable. The var attribute is the name of the varibale to be created and store the result. The mesgname attribute is the name of the message to be used. And the param attribute is the paramter name that we are interested in.

E.g. <entity ID="neuron_id" type="Neuron">
. . .
<param name="middle">
<getmessage mesgname="messageVar"/>
<getmessageparam var="paramValue" mesgname="messageVar" param="colour"/>
</param>
. . .
</entity>

Condition

These tags reside in two places. They may reside between the waitfor tags or they may be between the seekmessage tags. These tags simpply specify a condition on message parameters. The paramname attribute defines the name of the parameter that we want to test. Between the opening and closing tags, surrounded by double quotations, will be the desired value of the parameter. The attribute op may also be included an operator to help with a range. There is one extra operator for the condition tags which is ambig. This is used to compare widget names to general cases. So any instance of that widget will evaluate to true.

E.g. <condition paramname="colour">"blue"</condition>
<condition paramname="age" op="lte">"23"</condition>
<condition paramname="windowName" op="ambig">".main.a_screen.b_grid"</condition>
<!--so in this last condition .main#1.a_screen#3.b_grid#7 will evaluate to true, but something like .main#1.a_screen#5.c_screen#3 will evaluate to false-->

Waitfor

These tags reside under the param named "middle" in a neuron entity. The opening and closing tags form a block of code that will be executed when certain conditions are met. The opening tag is followed by a set of conditions that have to be met before it can then proceed with the rest of the code contained within the waitfor tags. Every set of waitfor tags are executed sequentially. So if we are currently at the first waitfor tag and the conditions are met for the second waitfor tag, then only the code outside all of the waitfor tags will be executed. Otherwise if the message that fired the neuron meets the conditions of the first waitfor tags and the neuron has not yet executed the code between the first waitfor tags, then it will do so. Note that the condition tags are optional. If no condition tags are specified then when a message fires the neuron then the code within the waitfor tags will be executed since there is no conditions to test.

E.g. <entity ID="neuron_id" type="Neuron">
. . .
<param name="middle">
<waitfor>
<condition paramname="colour">"blue"</condition>
. . . (Statements). . .
</waitfor>
<waitfor>
. . . (Statements) . . .
</waitfor>

</param>
...
</entitiy>

Pushmessage

These tags reside under the param named "middle" in a neuron entity. Neurons each provide their own individual statck where messages may be stored for future uses. The attribute mesgname is the name of the message that you want to push onto the statck. Note that you must first use the 'getmessage' tag before pushing a message.

Popmessage

These tags reside under the param named "middle" in a neuron entity. This tag allows us to pop a message off the top of the stack into a specified variable. The attribute mesgname is the name of the variable that will be created as well as hold the message that was poped off the top of the stack.

Seekmessage

These tags reside under the param named "middle" in a neuron entity. This tag will allow us to find a message in the stack based on a number of conditions. The attribute var is the name of variable that the result will be assigned to. If a message is found based on the conditions then the index in the stack will be assigned to the specifed variable. If nothing is found then −1 is assigned to the variable. Note that only the first message that satisfies the conditions is returned. The conditions must be inside the opening and closing tags of seekmessage.

Peekmessage

These tags reside under the param named "middle" in a neuron entity. This tag will allow us to retrieve a message out of the middle of the stack. Given an index in the stack we may retrieve the message into a new variable that we also specify. The attribute var is the index on the stack where the message we want resides. The attribute mesgname will be the newly created variable that will hold the retrieved message.

Dropmessage

These tags reside under the param named "middle" in a neuron entity. This tag will allow us to remove a message from the middle of the stack. Given an index in the stack we may remove that message. The attribute var is the index on the stack where the message we want to drop resides.

E.g. <entity ID="neuron_id" type="Neuron">
...
<param name="middle">
<getmessage mesgname="messageVar"/><!—get the message that fired us—>
<pushmessage mesgname="messageVar"/><!—push it onto the stack—>
...
<create var="index"/>
<seekmessage var="index">
<condition paramname="colour">"blue"</condition>
</seekmessage>
<!—index should contain the index on the stack if the message was found with a parameter colour=blue—>
<peekmessage var="index" mesgname="foundMessage"/>
<!—foundMessage should contain the actual message—>
<dropmessage var="index"/>
<!—the message previously found is removed from the stack—>
</param>
...
</entity>

Accordingly, the implementation of business logic including Neurons in the first tier 14 and Reports in the middle tier 26 can be programmed by the software designer for inclusion with the parameters 40, 44.

Abstract Based Declarations

Referring to FIG. 2, the development system 12 also uses input parameters 40 to help generate the abstract application description file 38, from which the central platform application 30 is generated. The descriptions 38 can be store in platform independent format. The file 38 is preferably written in an abstract notation such as XML, which makes use of structure tags to describe the data contained in the file 38. In particular, HTML can also be used as an abstract language with standard tags, however the XML format also provides capability of defining tag names to further accurately describe the data contained in the file 38. Accordingly, the file 38 contains descriptions of applications written in the abstract notation language, XML, whereby every element of the application 30 is represented by an entity that is described in the file 38. These entities in general can represent a visual, behavioral, and data aspects of the application 30.

The visual entities can include screens, buttons, and images. Behavioral entities can involve neurons. Data entries can include records, fields, and queries. As discussed below, the entities can be defined by the respective type, parameters, children, and are referenced by their ID. The entities in the application 30 can have parent child relationships, which determine the overall structure of the application 30. Accordingly, the file 38 once assembled is a declaration of all the various components which can be found in the application 30, such as but not limited to grids, records, screens, database queries, and database tables. These components are then related to one another by a series of parent/child relationships which facilitate the components to be reused (i.e. having multiple parents). A sample code listed below is used to illustrate the relationships that can exist between entities and to exemplify the usage of the XML format to provide the files 38:

```
<entity ID="batch_trans" type="Screen">
02      <param name="name">Transactions</param>
03      <child name="batch_trans_grid">
04          <param name="row">1</param>
05          <param name="column">0</param>
06          <param name="rowspan">1</param>
07          <param name="columnspan">1</param>
08          <param name="anchor">NORTH</param>
09          <param name="fill">BOTH</param>
10          <param name="ivars">batch_grid.rowid = parent.parent,
            squery = parent.parent.batch_grid</param>
11      </child>
12      <child name="transactions">
13          <param name="row">0</param>
14          <param name="column">0</param>
15          <param name="rowspan">1</param>
16          <param name="columnspan">1</param>
17          <param name="anchor">CENTER</param>
18          <param name="fill">BOTH</param>
19      </child>
20  </entity>
21  <entity ID="batch_trans_grid" type="Grid">
22      <param name="name">Transactions</param>
23      <child name="batch_trans_query">
24      </child>
25  </entity>
26  <entity ID="transactions" type="Image">
27      <param name="name">Transactions Title</param>
28      <param name="image">image/transactionstitle.gif</param>
29  </entity>
```

Accordingly, line 1 of the sample code begins with the definition of the entity within the application 30. The entities type is declared near the end of line 1, which provides a "screen" which describes the screen within the application 30 to be generated. Line 3 is the first occurrence of the parent child relationship that exists between the entities, which for this example "batch_trans_grid" is being defined as the child of "batch_trans", which is now regarded as a parent. Each child entity can have its own separate definition, which is not included in the definitions of their respective parents. Further examination of the above example code shows that line 3 references line 21 to define "batch_trans_grid". Accordingly, lines 4 through 9 are lines of code that are specific to the layout system of the application 30 and describe how the "batch_trans_grid" entity will be visually represented in the graphical user interface 58 (see FIG. 6) displayed on the device 18 by the application 30. Line 10 describes an Intelligent Variable (IVAR), which links the behaviors of the entities concerned.

Applications 30 that are considerably high in complexity generally involve an elaborate data structure, representing the intricate parent child relationships between the entities. Accordingly, referring to FIG. 6, which is the example interface 58 for the device 18, has been generated as a result of the above presented XML code of lines 1 to 29. The interface 58 shows a series of widgets 60a, b, c or display elements, which are elements of the application 30 represented by the entities in the above sample XML code. The variety of widgets 60 can be categorized into three main groups, visual 60b, interactive 60c, and data access widgets 60a. The visual widgets 60b can include labels, images, screens, and tabs. Interactive widgets 60c can include buttons, clickable images, and input boxes. Data access widgets 60a can include grids, records, and reports. Accordingly, it should be noted that the above XML code description of the sample user interface 58 contains a series of platform independent widgets 60a,b,c that are represented by the entities contained in the file 38, through which the program generator 42 can use to generate the application 30 on a variety of platforms, which are dependent upon the type of parameters 50, 52, 54 that are specified by the program designer.

Figure 7:
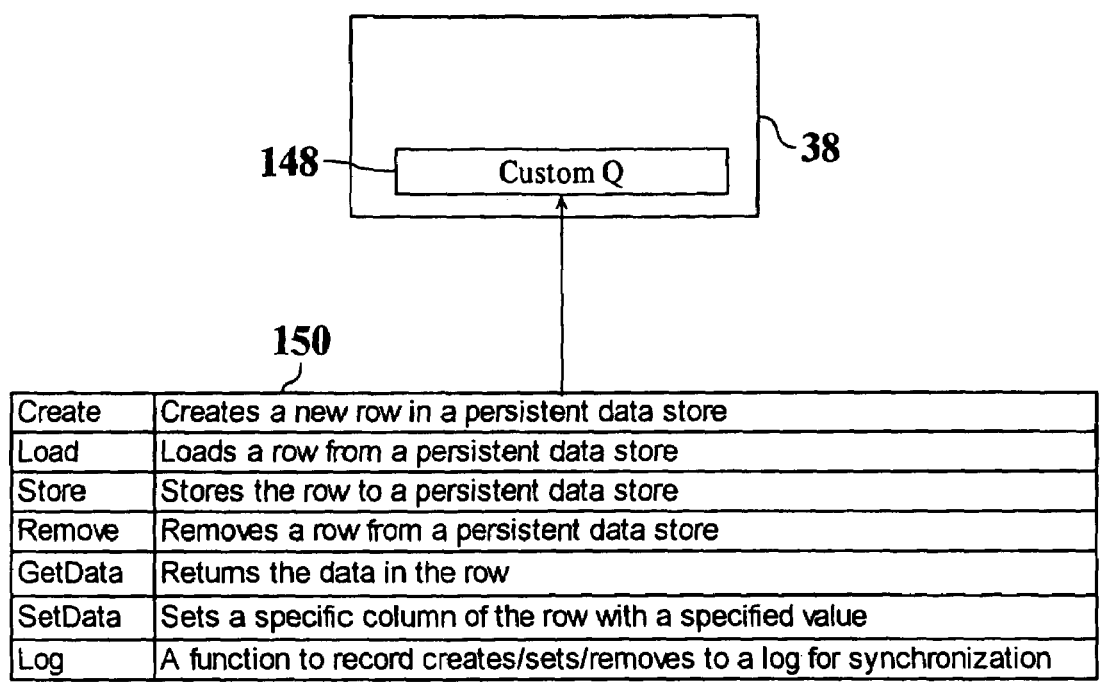
FIG. 7 is a block diagram of custom querying of FIG. 1.

Referring to FIG. 7, in order to support legacy data sources 20a, b you can create custom tables 150 and custom reports, by providing custom declaration 148 in the file 38.

Custom reports trigger a transaction like behavior such as purging old data in the databases 20a, b. They are constructed involving procedural method which returns a string of XML to be displayed.

Custom tables 150 are specified on a row level as many legacy applications are row oriented. Each row object needs to support seven simple operations:

The first six methods can perform their function as specified, the seventh function can be defined but can be left empty. If the function is left empty no logging is supported on the custom table 150. Logging is used to synchronize various clients 18 without reloading all of their data. Assuming one user 18 makes a change and the other 18 wishes to update they could simply query the log for the changes made. If logging is not supported then they can reload all of the data.

Custom reports and tables 150 can be defined in two languages C# or Java. If defined in Java they can be used by either the passthrough system 24 or the EJB server 26. If defined in C# then they can be used in the COM 28b system.

The loadData( ) gets all the non-standard data from the datasource 20a,b and returns it in the Table-Data, which is more or less a wrapper for a Vector of StringVectors, each of which is a row in the table. The StringVector is a wrapper class created to lower the amount of excessive casting when using a Vector of Strings. The loadMetaData( ) gets the field information and returns it in a TableDef, which contains a vector of FieldDefs. Each FieldDef contains information about a field such as its name, default value, and names of any queries that generate its pull-down menus in the case of a field that contains integers, which refer to the handle fields of other tables. The save( ), saves changes to the data source 20a,b. Changes are stored within CustomTableBase 154 in a Vector of TableChange objects. TableChange extends Vector and contains RowChange objects, each of which describes a single change to the data. Revision numbers can be used to inhibit conflicting data from reaching the data sources 20a,b and to facilitate optimization and sort TableChanges.

Furthermore, there are three integer fields 156, 158, 160 in the CustomTableBase 154. The loadedStatus 156 stores the revision number the table 162 was at when loaded. The lastCheckedStatus 158 is used with the sync( ) method, whereby sync( ) asks the data source 20a,b for changes made to it since lastCheckedStatus 158 and sets lastCheckedStatus 158 to the current revision number of the table 162. The sync( ) helps in the PassThru Query System when more than one client 18 is able to access the data source 20a,b simultaneously. However, if there is only one client 18, then it is anticipated that the data source 20a,b is in sync with that client 18. Under EJB 28a, it is possible that multiple users 18 can use the table 162 simultaneously, but preferably only one instance of the table 162 will exist at one time and therefore the table 162 would be in sync with the database 20a,b. The currentStatus 160 represents the status the CustomTable 154 contains. This value 160 can be incremented whenever the table 162 is updated by the user, but may make no assumptions about the state of the data source 20a,b. The tableUpdate vector stores the TableChange for the changes made at revision foo at location (foo-loadedStatus-1).

It should be noted that save( ) and sync( ) facilitate consistent pointer usage within the Custom Queries 148 of the application 30. It should also be noted that for tables 162 associated with SQL Databases 20a,b exclusively, appropriate table access routines may already be included in the DBTable EJB 28a family and accordingly custom queries 148 may not be needed.

Application Editor

Figure 8A:
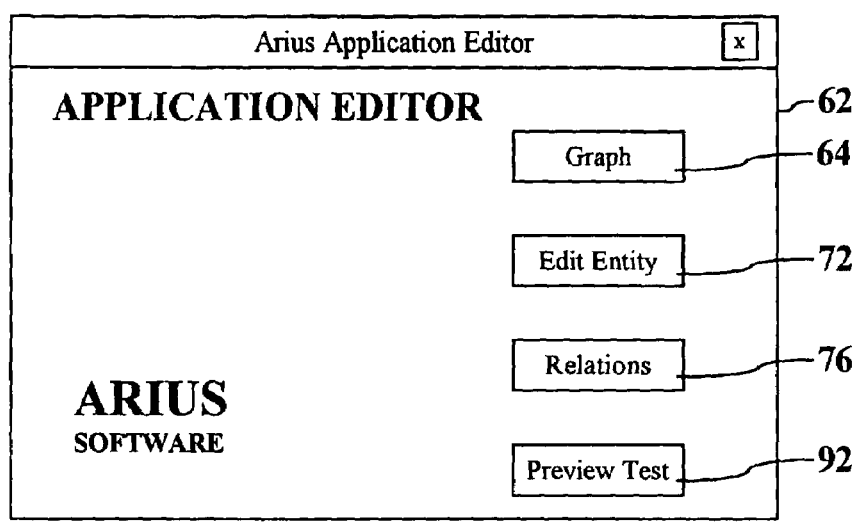
FIGS. 8a, b, c, d, e, f is an example Application Editor of the system of FIG. 1.
Figure 8B:
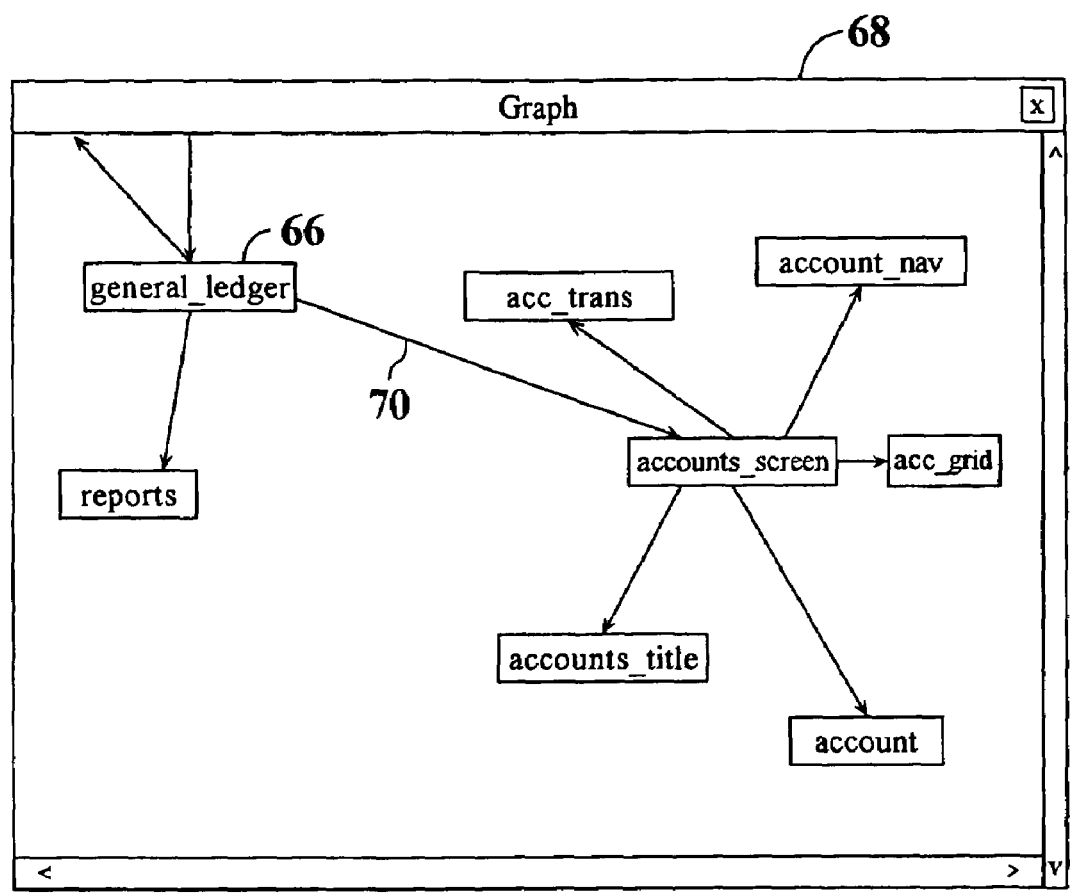
Figure 8C:
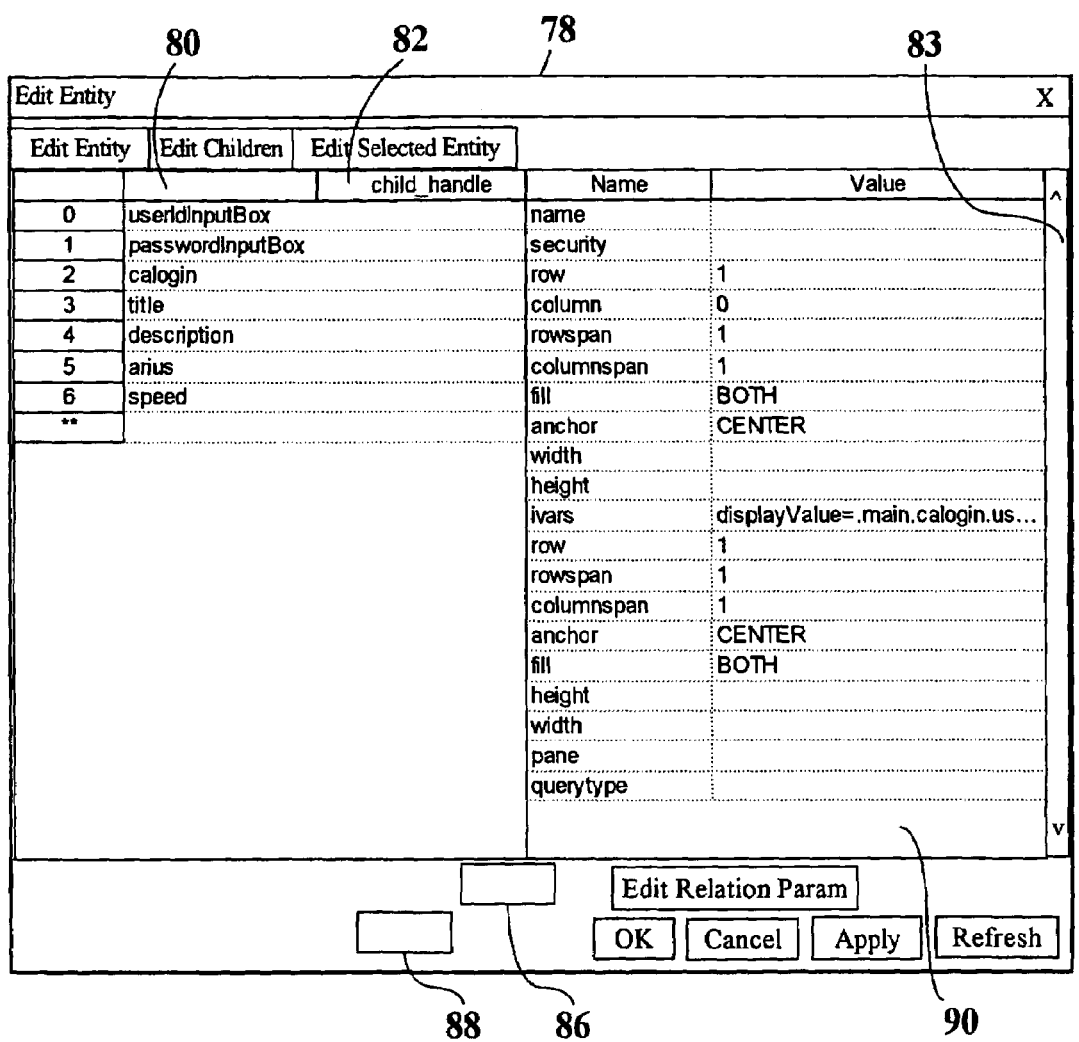
Figure 8E:
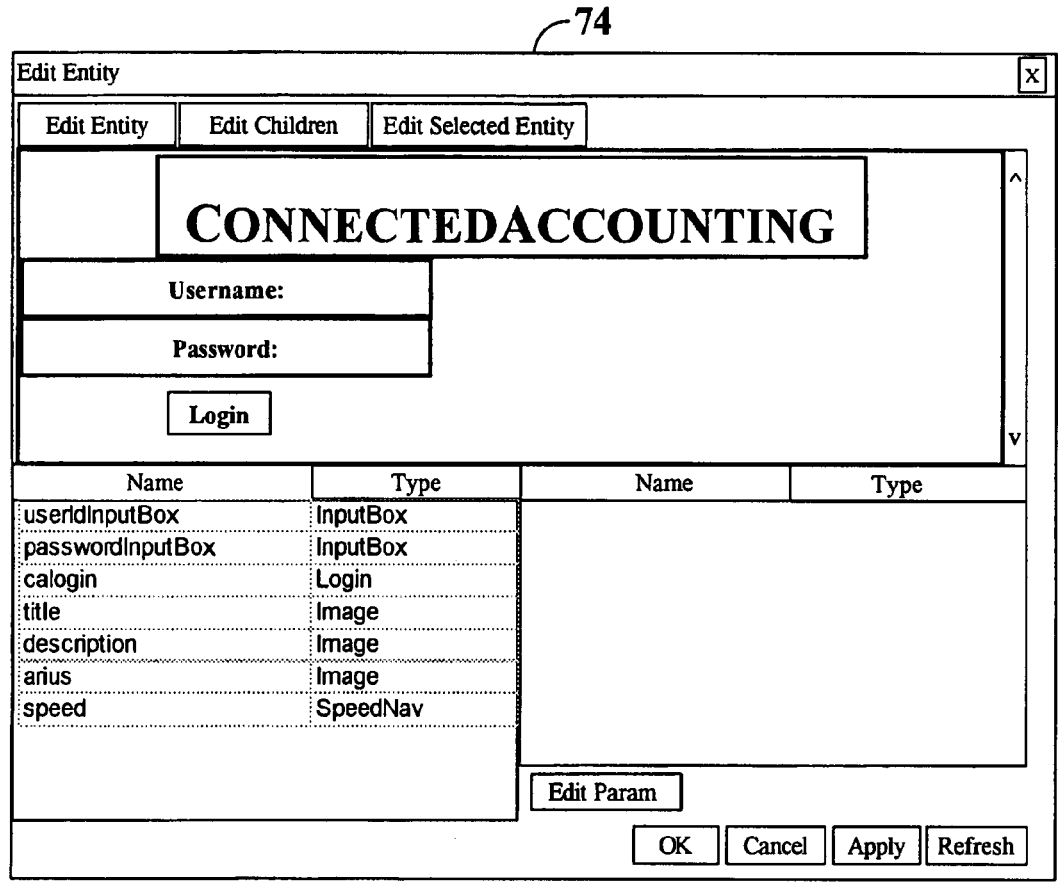
Figure 8F:
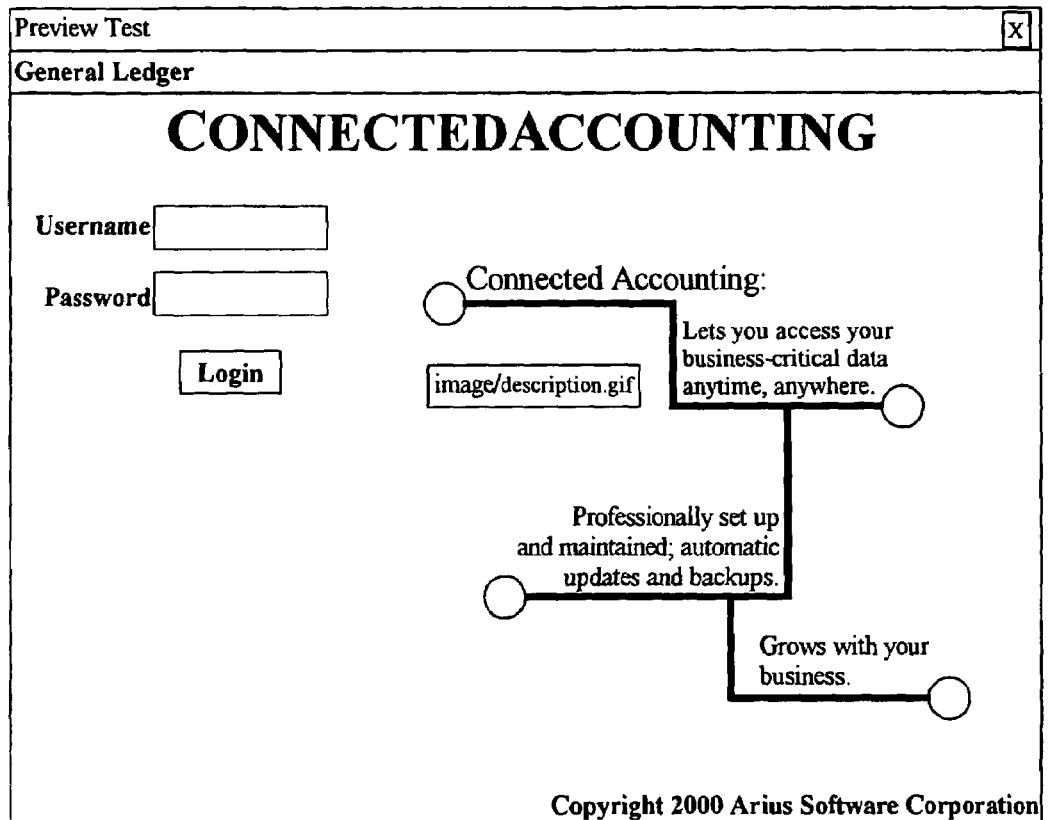

Referring to FIGS. 8a, b, c, d, e, f the application editor interface 62 can be executed on an appropriate computer by the program designer to edit all desired features to be contained in the file 38. The editor 62 facilitates the modification of application entities 66 and their relationships 70, as well as to preview how the applications interface would look as accessed by the devices 18. Accordingly, the application editor 62 allows for the entry of declarations for the application file 38. The editor 62 contains a graph button 64, which allows the program designer to see the relationships 70 between all of the graphically presented entities 66 in a graphical manner in window 68. The presented graph in window 68 is a series of the entities 66 which are connected by directed lines 70. The application editor 62 also contains an entities button 72 which opens a window 74 containing grids that allow modification of the entities 66 in the program 38. The window 74 allows the program designer to modify the properties of the entity 66, add new entities 66, change entity types, and modify the relationships 70 and organization parameters for child nodes. The relations button 76 of the editor 62 can open an additional window 78 containing parent handle drop down lists 80, a child handle drop down list 82, a scroll bar 83 to go through the various entities 84 as shown in window 74, and an additional button 86 to create new relationships 70, as well as a delete button 88 to delete relationship 70 and a grid 90 to display parameter values of selected parent entities 66. The application editor 62 also contains a preview button 92 to allow the program designer to review the various entities 66 already incorporated into the application file 38, thereby providing a sample preview interface resulting from the entities entered thus far in the file 38 which will eventually be generated by the compiled version of file 38, i.e. central platform application 30, for display on the devices 18, such as the interface 58 shown in FIG. 3. FIG. 8f shows a sample interface 18 of the editor 46 from FIGS. 8a, b, c, d, e.

The entity section 74 contains all the entities 66 entered thus far in the application file 38, whereby new entities 66 can be added by entering the new entities ID, changing of an entity type by entering the new type, and changing an existing entity 66 ID, as well as browsing all the entities 66 contained in the file 38 thus far. The section 74 contains the parameters for the entity 66 currently selected, whereby the parameter values can be modified by clicking on the parameter value and changing as necessary. The section 74 contains a list of all the children for the parent entity 66 currently selected. Accordingly, the section 74 can be used to add a child node 66 by clicking in the child handle column and selecting the entity you would like to include as the child node. The section 74 contains all of the valid parameter names and their values for the child node 66 currently selected, whereby these parameter values and names can be changed by clicking on the Parma value field and modifying the value contained therein as required.

Figure 9:
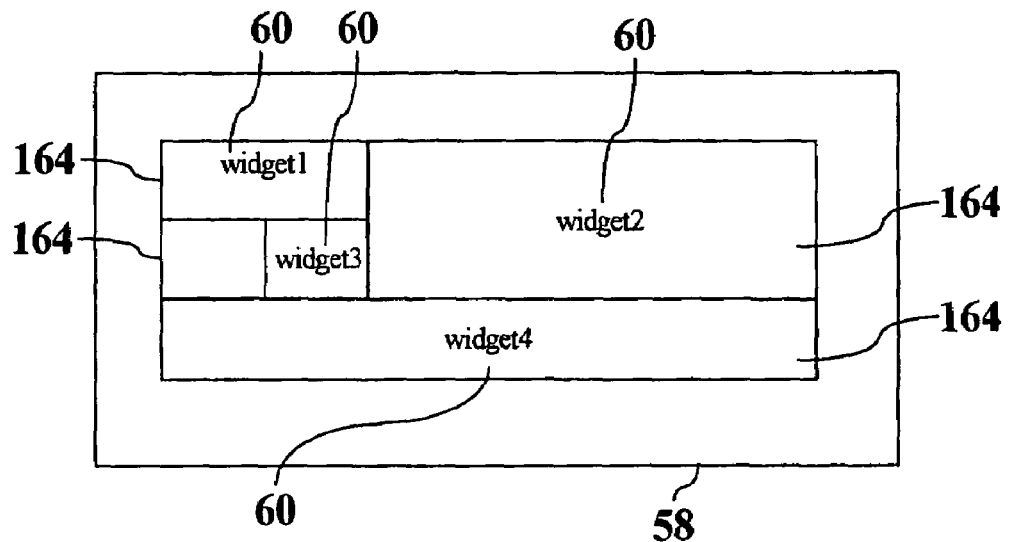
FIG. 9 is a further example of the Editor of FIG. 8.

Referring to FIG. 9, when a widget 60 is added to the screen 58 the location must be specified, such as by using a number of cells 164. For example, the upper left cell 164 of the interface 58 can be referenced by (0,0). Accordingly, when adding a child entity to the screen 58 to be represented by the corresponding widget 60, its displayed location can be defined by indicating row and column numbers. Furthermore, other layout options are also available, such as columnspan, rowspan, fill, and anchor. Columnspan and rowspan attributes specify the number of columns or rows the widget 60 will span in a particular cell 164 or group of cells 164. The fill attribute specifies how the widget 60 itself should fill its corresponding cell 164. Possible values for the fill attribute are NONE, HORIZONTAL, VERTICAL, or BOTH. The anchor attribute may take on nine different values specifying a location inside the cell 164, such as NORTHWEST, NORTH, NORTHEAST, WEST, CENTER, EAST, SOUTHWEST, SOUTH, and SOUTHEAST, as shown in FIG. 9b. The following code represents the example widget 60 placement shown in FIG. 9a:

widget1: row=0 column=0 anchor=NORTHWEST
widget2: row=0 column=1 rowspan=2 fill=HORIZONTAL anchor=WEST
widget3: row=1 column=0 fill=VERTICAL anchor=NORTHEAST
widget4: row=2 column=0 columnspan=2 fill=BOTH As defined above, widget2 expanded horizontally to fill available space, so the anchor value could as well have been CENTER or EAST. Widget3 expanded vertically to fill available space, so the anchor value could as well have been EAST or SOUTHEAST. Furthermore, in the event that no cell location is specified for the widget 60, the widget 60 would be added to the bottom of the cell 164 spanning across the entire row. In addition, widgets 60 are added to the bottom in the same order as originally created by the application 30. This can facilitate the addition of widgets 60 to the bottom of the screen 58. Furthermore, for non-viewable widgets, there is usually no point in specifying a location on the cell 164. Accordingly, widgets can be added to the screen 58 without having to specify a particular location.

Figure 10:
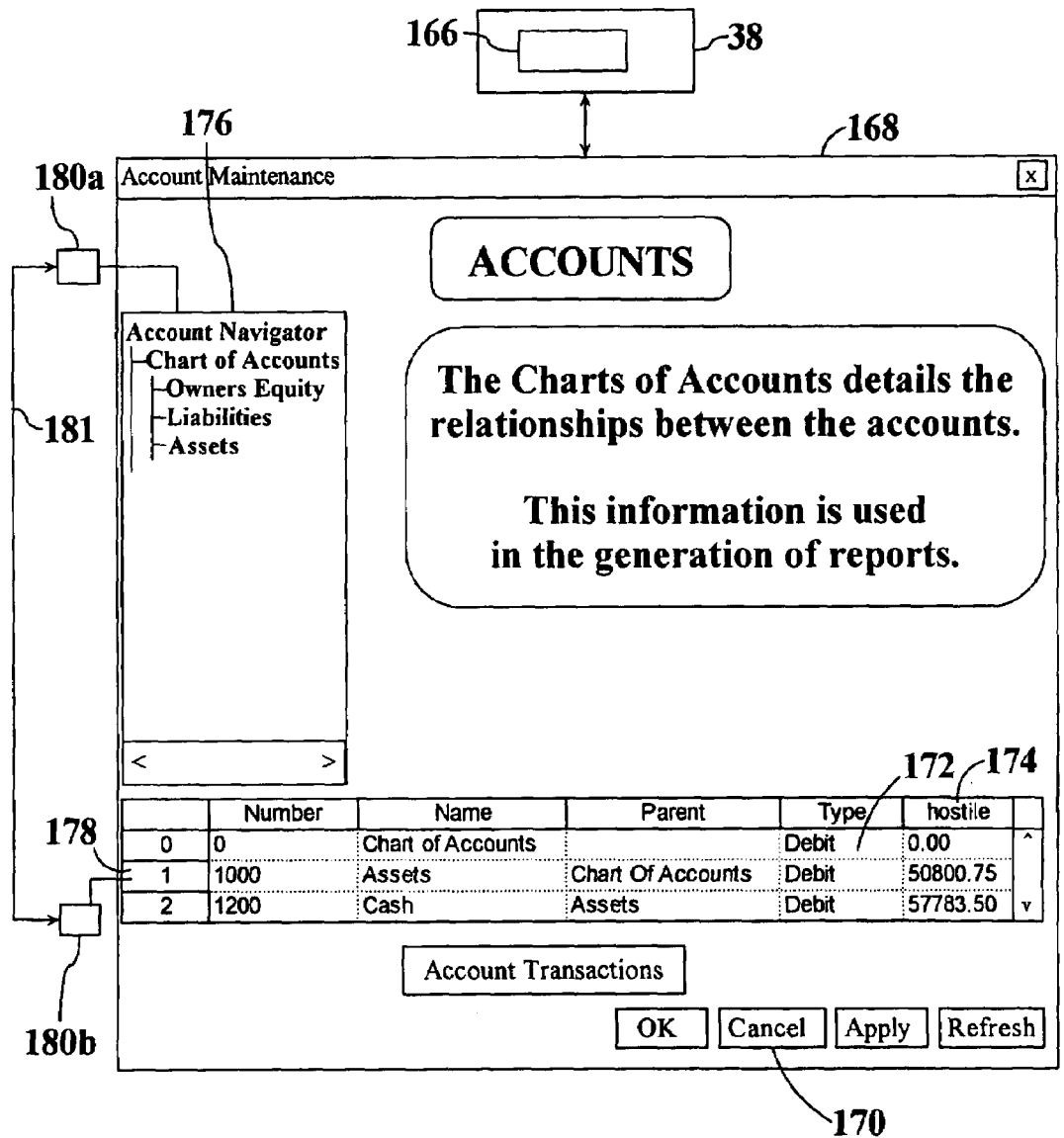
FIG. 10 is an implementation of an application of FIG. 2.

The connections 70 between the entities 66 (see FIG. 8) provides a set of "entities" 66 in the application 30 connected to each other by a set of relationships 70 in a rather hierarchical fashion, even though some entities 66 have more than one parent 66. On the interface 58, many of the entities 66 turn into visible objects the user of the device 18 can see, such as but not limited to Grid, Graph, Navigator, and Screen. Other entities 66 may never be visible as widgets 60, such as but not limited to Publish, and Query. Accordingly, referring to FIG. 10, a relationships table 166 of the application 30 can monitor which entities 66 appear inside of other entities 66 on an interface screen 168 of the device 18. For example, which Tabs 170 are in the Screen 168 or which Fields 172 are in a Table 174, as displayed by the representative widgets 168, 170, 174. However, other kinds of relationships 70 may not get separate tables in the metadata database 20a,b. For example, a current selection in a Navigator 176 might change the currently displayed row or record 178 in the Table 174, or move the selection in a Grid. It might also affect the Query object that controls Grid contents, like in an accounting application, so the Grid shows all transactions 178 attached to the currently selected account in the Navigator 176. Accordingly, the construct that entities 66 use to communicate with each other in the application 30 can be an Ivar or ivar 180.

The "I" in Ivar 180 stands for Intelligent, as in Intelligent Variables. Ivars 180 are used to connect 70 various entities 66 and permit them to work together intelligently. For instance, the Navigator widget 176 could choose which row of the database appears in a Record widget 178, or how to link a where clause of a Squery up to the value in an Input Field. In addition, not specifying full pathnames when targeting an entity 66 for connection 70 to other respective entities 66 can be accomplished by matching ivars 180. For example, if a Navigator N in the Tab X of screen B, which is a child of screen A, is to control the grid G right beside it in Tab X, it may not be necessary to point the navigator at A.B.X.G for functionability. Instead, an input such as wid=parent.parent.G, would specify where the grid is in relation to the navigator. More complex situations, for example, might have a screen called Transactions that contains a Grid G which lists the current set of transactions. The Transactions screen is a child of the Accounts screen, which has a grid AG. Selection of an account in AG and clicking the button would result in the Transactions screen popping up with a list of the various transactions that were done on that account. In using Ivars 180, this could be accomplished by referring the squery in the Transactions.G grid to parent.parent.AG, which would find the appropriate AG. This is in comparison to specifying the full path A.B.Accounts.AG. Accordingly, the queries (functionality) need not be changed in response to a rearrangement of the layout (formatting). Furthermore, the ivars 180 facilitate the reuse of the grids AG and G in different screens and different arrangements, in which they will be able to find each other through the specification of selected ivar matching. Ivars 180 can make the entities 66 reusable.

Again referring to FIG. 10, in specification of the entity 176 that publishes the ivar 180a, the ivar 180a can be linked to an ivar 180b published by the other entity 178, perhaps one on the same screen 168. Accordingly, the Navigator 176 and the Record 178 on the same screen 168 can be linked by their 'rowid' ivars 180a,b respectively. This linking can be done by specifying a matchlist 181 on one or both of the entities 177, 178 recorded in the table 166 of the file 38. For example, the screen 168 with ID 'exampscreen' with two children; the Navigator 176 with ID 'nav-one' and the Record 178 with ID 'rec-two' is recorded in the table 166. Each of the children 176, 178 exports the respective ivar 180a,b called 'rowid'. The two 180a,b by placing the following code in the nav-one entity of Table 166:
<param name="IVars">rowid=parent.rec-two.rowid </param>.

Accordingly, in the run-time application platform 30, the entity .main#1.exampscreen#5.nav-one#12 with matchlist 181 'rowid=parent.rec-two.rowid' would link main#1.exampscreen#5.nav-one#12.rowed to match the ivar .main#1.exampscreen#5.rec-two#12.rowid. It should be noted that the 'rowid=' part of the matchlist 181 refers to the ivar 180a named 'rowid' in the nav-one en-tity. The 'parent' in the matchlist 181 is used to go up the respective hierarchy by one level. Furthermore, multiple parent tags could also be implemented in a more complex hierarchy, as in 'rowid=parent.parent.otherscreen.othemav.rowid'. In addition, it is possible to have multiple entities that all match a given ivar matchlist 181. If this occurs, the ivar 180 will link up with ALL matching ivars 180, which would have the effect of linking the ivars 180 of two widgets 60 previously separated. It is also possible to specify multiple matches in the same matchlist 181 for one entity 66, by separating them with commas: <param name="IVars">rowid=parent.rec-two.rowid, rowid=parent.parent.grid.rowid, datafield=childname.rowid </param>. It should be noted that the ivar matchlist 181 can use relative paths or absolute paths.

In the XML language notation of file 38, the Ivars 180 can be created by calling initIvar(String name, String matchlist). The name is the fully qualified name of the ivar 180, and matchlist 181 is the matchlist of the entity 66 publishing the respective ivar 180. InitIvar is usually called in an entity constructor. Ivars 180 can be set with setIvar or get their values with getIVar. In addition, in the event that your ivar 180 gets changed by another device 18, the corresponding widget 60 implements a IvarReceiver to register as a listener, thereby receiving notification of the change. Preferably, all the links 70 are bi-directional and independent of creation order. Types of ivars 180 can include Temporary Ivars which are associated with a particular device 18 session. The device 18 can set the temporary ivar, like setting a variable, which is then available for the device 18 throughout for the session. Accordingly, when the device 18 logs out or times out, the temporary ivars the device 18 created are destroyed. Permanent Ivars are associated with a database 20a,b. When a permanent ivar is set, it is stored in the database 20a,b, thus it is not destroyed when the device 18 logs out or times out (i.e. it is persistent. Server Ivars cannot be set by the device 18, rather they can only be retrieved.

EXAMPLE ENTITIES AND RELATIONSHIPS

The application 30 is built out of entities 66—objects such as grids, tables, groups, queries, and screens, which are combined by relationships 70. For example, a screen with a table and a grid in it. Each relationship 70 consists of a "parent" and a "child" entity 66.

For entity 66 naming, as the generated application 30 runs, it creates various screens, which contain widgets 60 and other screens, generating a hierarchy of widgets 60. Each of these widgets 60 must have a unique name in order to be unambiguously referenced. Each entity 66 in the file 38 has a unique ID, but lacks the ability to specify names for objects in a run-time system 10. We could have multiple instantiations of a single entity 66 and those instances could occur in different locations on the hierarchy of entities 66. Run-time entities 66, thus, are assigned unique names that can look something like: .main#1.subscreen#5.samplegrid#12. The name of the widget 60 is preferably determined by taking its ID, adding '#' and a unique number, then appending that to the name of its parent. This facilitates determination at a glance both the entity 66 ID and ancestry of a run-time object. The name .main#1.subscreen#5.samplegrid#12 can be broken down into the main application 30 entity 66 with ID 'main' and run-time name .main#1. It has a child which is a screen, with ID 'subscreen' and run-time name main# 1.subscreen#5, and itself has the grid with ID 'samplegrid' as a child.

In regards to Ivar 180 naming, many widgets 60 (generally the ones which access data) publish Ivars 180. For instance, a Grid widget 60 will publish a rowid Ivar 180, which contains the rowid of the currently selected row in that grid and also publish one Ivar 180 for each column, containing data for the currently selected row in that column. Thus a grid called:
.main#1.subscreen#5.samplegrid#12 would publish the ivar .main#1.subscreen#5.samplegrid#12.rowid.

Some common features exist across entities 66. Each entity 66 supports a security parameter 56. This disables the entity 66 (requires permanently) if the correct permissions condition is not met, or an ivar 180 equality is not met.

There can be two main types of required parameters: over-loadable parameters (O-params) and a complete set of all parameters (A-params), as given with examples in the sample entities 66 listed below. Over-loadable parameters can be changed depending on where the entity is reused.

Each application 30 generated by the generator 42 can have one top-level entity 66. The top-level entity 66 is of type Application and is never used as the "child" part of a relationship 70.

'Application' Entities
Contained by: TOPLEVEL
Contains: Any
A-param: Id, name, appname, querysystem, delay, servername
O-param: None The meaning of the parameters for these top level entities 66 are defined as:
name—Displayed title of the main window of the application;
appname—Name of the application;
querysystem—The system for querying the database;
delay—The delay between automatic refreshes of data; and
servername—The name of the server containing the database.

As a top-level entity 66, an Application entity 66 can't use Require or Conflict or have any security. It always gets created. Application entities 66 log the user 18 in as guest by default. The user id ivar 180 is initialized to "guest" and the password ivar 180 is initialized to a null string.

Containers are entities 66 that visually contain other ones. Nearly all entities 66 can have children created in the relationships 70 table, but the children of a Grid, for example, are treated specially. On the other hand, Container Entities 66 can be used purely for layout purposes and don't change the way child entities 66 work. Since containers 66 can enclose other containers 66, you can nest them until your application 30 looks as desired in a predetermined manner.

'Screen' Entities 66
Contained by: Container, Table
Contains: Any
A-param: Speedkey, name, require, delay, popup, security
O-param: None The meaning of the parameters for these top level entities 66 are defined as:
name—Reference use;
delay—Used to set a refresh delay timer;
popup—Test used for popup tooltiptext in button widget 60 for when the entity 66 called as an applet; and
security—Check for security.

A Screen is a top-level window in the application 30. If the Screen is used as a child of any container object, it will be displayed as a button that you can click on to expose the new screen.

In a web interface 18, a screen can usually define a single generated HTML page.

'Group' Entities
Contained by: Container, Table
Contains: Any
A-param: Id, name
O-param: None The meaning of the parameters for these top level entities 66 are defined as:
Name—Name of the group.

The Group is a rectangle that contains other objects. You can use it to tweak the layout of your entities 66 in the current window. If the Group entity 66 has a occupied "name" field, then it appears as a visible frame with a subtitle. Otherwise, the group itself is completely invisible and only its child widgets 60 can be seen.

Middle tier 26 Entities 66
Contained by: Application, Screen
Contains: Query
A-param: Id, name
O-param:

The Middle tier Entity 66 class is currently used in generation of the sub-application 34 for the middle tier 26 and so is a parent to all labels and fields in the application 30.

Database Entities 66
Contained by: Application
Contains: Table
A-param: Id, name
O-param:

The Database Entity 66 class is used in generation of the sub-application 32 for the end tier 16 and so is a parent to all tables and fields in the application 30.

'TabSet' Entities
Contained by: Container
Contains: Any
A-param: Require, name, id, security, row, column, fill, anchor
O-param: Row, column, fill, anchor The meaning of the parameter for these tabset container entities 66 are defined as:
name—For reference use.

A TabSet entity 66 can appear using a "notebook tab" type of display. With a note-book, you can click on a tab at the top of a window and change what is currently displayed. A tabset 66 preferably should have only screen as children.

Read-only Entities 66 can be represented by

'Report' Entities
Contained by: Container
Contains: None
A-param: Id, appname, name, file, width, height, code, require, row, column, fill, anchor
O-param: Row, column, fill, anchor The meaning of the parameter for these tabset container entities 66 are defined as:
name—For reference use;
appname—Name of the Entity. Used in superclass JavaReport.java;
file—Name of file assosiated with the Entity Code Additional code supplied;
fill—Used for Layout Constraints;
row—Used for Layout Constraints;
column—Used for Layout Constraints; and
anchor—Used for Layout Constraints.

With the introduction of squery, the file 38 could also be useful for updating the database 20a,b ("scripted transactions"). In the accounting application, we might use it to post a batch of transactions. Reports work (or should work) like this:
A Report entity in the appgenerator 42 is used as the child of a Screen, Group, or Tab when it appears as a pushbutton.
The application 30 requests a report from the query system by name; and
The query system then returns the display XML which is converted by the end user application 30 into something displayed on-screen of the device 18.

Another read only entity 66 is the 'HTML' Entities.
Contained by: Container
Contains: Any
A-param: Name, id, include, security, align, border, code
O-param: Height, width, row, column, rowspan, columnspan, fill, anchor The meaning of the parameters for these read only entities 66 are defined as:
name—Name of the entity;
include—Contains path and filename of HTML document to be included in the application;
border—Sets the border of the HTML displayed on the page, if border is omitted, default border is 0;
alignment—Alignment of the HTML, if alignment is omitted, de-fault alignment is left; and
code—Contains HTML code to be displayed in the application.

An HTML object allows you to write your own HTML code, but only in JSP mode.

Another read only entity 66 is 'Calc Box' Entities.
Contained by: Container
Contains: None
A-param: Id, name, label, mode, require
O-param: Row, column, fill, anchor, Ivars The meaning of the parameters for these read only entities 66 are defined as:
name—Name for the box;
label—Label on the box;
mode—One of 'text' or 'password', used with WAP applications; and
Ivars—as described above.

Calcbox entities 66 can be used as a way for the user 18 to view data in i-variables.

Another read only entitiy 66 is 'Image' Entities.
Contained by: Container, Table
Contains: None
A-param: Id, name, image, popup, require, messagetype, target, wapimage
O-param: Popup, messagetype, require, target The meaning of the parameters for these read only entities 66 are defined as:
name—Name of entity;
image—Filename of image to be displayed;
popup—Text displayed when mouse is dragged over image;
messagetype, target—Message is sent out to target when a mouse is dragged over image, these two parameters are dependent on one another, hence must be used together; and
wapimage—Contains filename of image, (used in WAP mode).

An Image entity 66 displays the image filename given in its param field.

Further read only entities 66 are 'Label' Entities.
Contained by: Container
Contains: None
A-param: Name, id, require
O-param: Row, column, rowspan, columnspan, fill, anchor The meaning of the parameters for these read only entities 66 are defined as:
Name—Caption of the label.

A Label object simply displays the text in its name field when it's used. Sometimes labels can be useful with security; for example, to display an "Access Denied" message when opening up a window. In the opposite case, to display a Group container that has useful information when access is allowed.

Another type of entity 66 is a Navigation Entity.

'SpeedNav' Entity
Contained by: Container
Contains: Any
A-param: Id, name, require, parent, child, type
O-param: None The meaning of the parameters for these read only entities 66 are defined as:
name—For reference use; and
type—Used to select style for HTML generation.

It corresponds to the menubar at the top of a window. The SpeedNav entity 66 can be used in the application 30, and can also be used as the standard navigator for that application 30. By default, SpeedNav can display all items in application.

A further navigation entity 66 is 'SpeedMenu' Entity.
Contained by: SpeedNav
Contains: Any
A-param: Speedkey, name
O-param: None The meaning of the parameters for these read only entities 66 are defined as:
name—Name; and
Speedkey—Key used to select.

A further navigation entity 66 is 'Graph' Entity.
Contained by: Container
Contains: Any
A-params: Id, name, label, parent, child
O-params: Ivars, row, column, rowspan, columnspan, anchor, fill The meaning of the parameters for these read only entities 66 are defined as:
name—Not normally used with Graphs;
label—Field name of label column;
parent—Field name of parent column; and
child—Field name of child column.

A visual entity 66 that displays the parent—child relationship in a cyclical manner, quite similar to navigators. Used in the Application Editor 46 to show entities 66 and relations 70.

A further type of entities 66 is Entities for User Input. The file 38 can accept user 18 input in three ways: the user 18 can click on Screen buttons, Notebook tabs (Tab entities), or on a SpeedNav entity 66 to open and close windows and move through the application 30; Record and Grid entities 66 allow the user 18 to edit data in SQL databases; and Input boxes allow the user 18 to enter data into input lines that are stored in i-vars 180. These can then be used in SQL queries or Require/Conflict entities to control the application's 30 behaviour.

One user input entity 66 type is 'Preview' Entities.
Contained by: Any
Contains: Query
A-param: Id, require
O-param: Ivars, row, column, rowspan, columnspan, anchor, fill The meaning of the parameters for these read only entities 66 are defined as:
Ivars—see above description.

The Preview entity 66 is used to preview other entities 66. The preview entity 66 is available for the applet portion and is currently used in the generator 42.

Another user input entity 66 is 'Login' Entity.
Contained by: Container
Contains: None
A-param: Id, name, popup, require
O-param: Row, column, fill, anchor, rowspan, columspan, Ivars The meaning of the parameters for these read only entities 66 are defined as:
name—Caption of button to be created; and
popup—Text displayed when cursor lingers over entity.
Creates, login or logout buttons.

Another input entity 66 is 'Table' Entities.
Contained by: Container
Contains: Any
A-param: Name, data, order, side, tables
O-param: Order, side, tables The meaning of the parameters for these read only entities 66 are defined as:name—For reference use;

data—Data to fill in the table;
order—Not implemented;
side—Left or right in join; and
Tables—Alias.

These entities 66 Publishes: $table, $recno($table), $table.handle,$table.[fieldnames]. The Table entity refers to an SQL table named after the entity's shortname. If an SQL table is called "frogs" with fields "name", "age", "arms" and "legs", you will create an entity of type Table with a shortname of "frogs". Under it, you would attach Field entities with shortnames of "name", "age", and so on. The appgenerator 42 does a search for all Table entities when it builds the application 30, and makes sure all the appropriate SQL tables exist and contain the right fields. The SQL table in the database 20*a,b* also has an additional magic field, handle, that acts as the table's primary key. All database access routines in the file 38 preferably depend on this primary key.

Another user input entity 66 is the 'CustomTable' Entity.
Contained by: Container
Contains: Any
A-params: Name, data
O-params: None If you need to use the system 12 to access, for example, a legacy Fortran app with an encrypted back-end, you can write your own Table abstraction 148. CustomTableBase 154 exists as a bridge between the application 30 and the data source 20*a,b*. It implements the methods in the AbstractTable 162, as described above.

Another user input entity 66 is the 'Record' Entities.
Contained by: Container
Contains: Query
A-param: Id, name, popup, require, Ivars, child, row, column, fill, anchor
O-param: Ivars, row, column, fill, anchor The meaning of the parameters for these user input entities 66 are defined as:
id—For reference use;
name—For reference use;
popup—Used for mouseOverStr in superclass JavaWidget;
Ivars—see above description;
child—Used for Ivars 180;
fill—Used for Layout Constraints;
row—Used for Layout Constraints;
column—Used for Layout Constraints; and
anchor—Used for Layout Constraints.

Record entities 66 are also used as part of the main application 30 to provide an entry form for data into an SQL table. Tables have the notion of a "current record number" (stored in the Ivar rowid) and they display all records from the table in the database 20*a,b*. The record entry form contains input fields taken directly from the table (Field entities), as well as CalcField entities that produce read-only values from SQL queries. To help communication between the Table entity, its Fields and CalcFields, the Table also publishes an Ivar 180 called $table (the shortname of the current Table entity) and a set of Ivars 180 called $table.FIELDNAME (one for each field in the table). Field entities each read and write their respective $table.FIELDNAME Ivars 180 based on user 18 input. The Table entity 66 collects them and saves or loads them from the SQL table whenever the current record number is changed.

Another input entity type 66 is 'Recorder' Entities.
Contained by: Any
Contains: None
A-param: Id, name, filename
O-param: None The meaning of the parameters for these user input entities 66 are defined as:
Name—Reference use; and
Filename—Filename used for output file for the superclass Recorder.

This Entity 66 is in charge of the Recorder component. The recorder is used to record the actions of the user 18.

Another input entity type 66 is 'Button' Entity.
Contained by: Container
Contains: Any
A-params: Name, id, label, messagetype, target, request, require
O-params: Row, column, fill, anchor The meaning of the parameters for these user input entities 66 are defined as:
name—Identifies the button. Not normally used with buttons;
label—The label on the button;
messagetype—The type of message that is to be sent. (i.e. Data, error . . . );
target—The channel on which the message will be sent; and
request—The value to give the message sent.

Sends a message when pressed. This message will be interpreted by other entities 66 to perform an action. (i.e. open a screen)

Another input entity type 66 is 'Input Box' Entities.
Contained by: Container
Contains: None
A-param: Id, name, label, hiddenlabel, datatype, mode, editable, require, popup
O-param: Row, column, fill, anchor, Ivars The meaning of the parameters for these user input entities 66 are defined as:
name—Used in the superclass JSPInputBox.java. (in JSP and Wap mode);
label—The text that is to be displayed along with the InputBox;
datatype—The type of data that the input box will be expecting, if this parameter is not specified, it will be equal to the value of the mode parameter, possible inputs: password, text, combo, boolean, char, varchar, image;
popup—The text that is to be displayed when a mouse is dragged across the entity;
editable—Determines whether the inputbox is editable or not, by default inputboxes are editable; and
mode—Can be either text or password.

Inputbox are used as a way for the user 18 to enter data into Ivars 180.

Another input entity type 66 is 'Grid' Entities.
Contained by: Container
Contains: Query
A-params: Name, require, help
O-params: Ivars, row, column, rowspan, columnspan, anchor, fill The meaning of the parameters for these user input entities 66 are defined as:
name—Name of the grid. Not visible.

A Grid entity 66 accesses SQL data in much the same way as a Table entity does, but it displays the data very differently. Instead of showing only one record at a time, a grid shows the data in a spreadsheet-like format with one record per row, and one field per column. Grids currently shows only Field and Calcfield entities that are its children. It also honours Require and Conflict entities that are parents of the Field enti-ties, so only the appropriate fields will be shown in the grid.

Another input entity type 66 is 'Navigator' Entities.
Contained by: Container
Contains: Query
A-param: Id, name, popup, label, parent, child, require
O-param: Row, column, fill, anchor, Ivars, rowspan, columnspan The meaning of the parameters for these user input entities 66 are defined as:
name—Used as a title of the entity, (root of the tree);
popup—The text that is displayed when mouse is dragged over the entity;
label—Text displayed in list;
parent—If parent is specified then you have a recursive navigator; and
child—If only the child is specified it is a flat list.

A Navigator entity 66 displays a hierarchical tree, generated from an SQL query, and changes the Ivar $rowid according to the currently selected item in the tree. This changes the current row displayed by the appropriate Table or Grid entity. A Navigator has a Query entity as one of its children, which provides the data for the tree. Furthermore, Navigator entities 66 can also act like most other entities 66, as they do not have to be children of Table or Grid entities 66.

Another input entity type 66 is 'JavaAction' Entities.
Contained by: Container
Contains: None
A-param: Id, name, popup, code
O-param:

The meaning of the parameters for these user input entities 66 are defined as
name—Used as a label for the button corresponding to this entity 66;
popup—Text is displayed when the mouse is dragged over the entity 66; and
code—Java code that is to be executed during runtime.

Allows you to execute java code from within the xml file 38. The entity 66 is displayed as a button, which when pressed executes the code that is written in the file 38.

Another input entity type 66 is 'Field' Entities.
Contained by: Table
Contains: Query
A-params: Id, name, datatype, security
O-params: None The meaning of the parameters for these user input entities 66 are defined as:
name—Name of the field; and
datatype—Type of data to be held in the field (i.e. int).

A Field entity 66 is one field (also known as a column) in an SQL database, or a field in a non-SQL-based entry form. The "shortname" of the field entity 66 determines its I-variable name (which will be $table.shortname) and the field name used in SQL. The "param" field is the SQL data type to use, which can be any data type supported by SQL or one of the magic data types "money", "phonenumber", or "password." A Field doesn't actually do SQL access itself; it merely sets an I-variable and expects its parent (a Table, Form, or indirectly, a Grid) to deal with loading or storing the value if necessary. If the Field has a Query as its child, the set of possible values is restricted to the data returned by the SQL query. The query is special and works like this: If it returns exactly two columns, then the first column is the data to store in the database, and the second column is the data to display for the user. For example, you could have 1 Blue 2 Red 3 Green and the field would display a drop-down box with the choices Blue, Red, and Green. If you selected Green, it would store '3' in the I-variable, which eventually gets written to the database.

Another input entity type 66 is 'CalcField' Entities.
Contained by: Table
Contains: WVEPS
Publishes: $table.[shortname]
A-params: Id, name, code(to be added)
O-params: None The meaning of the parameters for these user input entities 66 are defined as:
name—Name for the field.

CalcFields can be used to represent aggregate functions in SQL such as SUM( ) and AUG( ).

A further type of entities 66 are 'Invisible' Entities that Send or receive messages.
'Publish' Entities
Contained by: Application
Contains: None
A-param: Id, name, value, Ivars
O-param:

The meaning of the parameters for these user input entities 66 are defined as:
Ivars—Name of the Ivar to be published; and
value—Value of the Ivar variable to be published.

A Publish entity creates an Ivar 180 named after the entity's 66 shortname field, with the contents defined by its "param" field. Note that Table and Grid entities 66 also publish Ivars 180, but they are named something like "tablename.fieldname". There is no "tablename." in an Ivar 180 created by Publish, although you can simulate it by using something like "frogs.legs" as the shortname. Publish entities 66 aren't actually displayed anywhere in the generated application 30; they're invisible, but behave as if present.

Another type of invisible entities 66 are 'Localization' Entities.
Contained by: Application
Contains: None
A-param:
O-param:

Localization entity 66 allows you to display text in several different formats, according to the mapping selected. For example: <entity ID="localeTable" type="Localization">
<localization>
<locale name="default">
<string refid="1">A label</string>
<string refid="2">A screen</string>
<string refid="3">Popur Label</string>
</locale>
<locale name="other">
<string refid="1">A similar yet distinct label</string>
<string refid="2">A Screen</string>

```
<string refid="3">ToolTip</string>
</locale>
</localization>
</entity>
<entity ID="labelscreen" type="Screen">
<param name="name"><ref>2</ref></param>
<param name="popup"><ref>3</ref></param>
<child name="applabel"></child>
</entity>
```

In this example the parameter name of the entity 66 screen (labelscreen) is referenced to "Screen".

Another type of invisible entity 66 is 'Neuron' Entities.
Contained by: Container
Contains: Query
A-param: Id, require, name, in, middle, out
O-param: Row, column, fill, anchor The meaning of the parameters for these user input entities 66 are defined as:
top—Parameter specifies channel on which neuron is listening;
middle—Contains java code to be executed when neuron is fired;
out—most applications 30 contain the tag.

Neuron is a listener that listens to a channel specified in the 'in' parameter. When it receives the message it executes the Java code specified in the middle parameter.

Another invisible entity 66 is the 'Help' Entity.
Contained by: Container
Contains: Any
A-param: Id, name
O-param: None Instantiates a help system. All entities 66 contained within the help entity should have a help parameter.

Another invisible entity 66 is the 'Cursor' Entity.
Contained by: Container
Contains: None
A-param: Id, name, require
O-param: None The meaning of the parameters for these user input entities 66 are defined as:
name—Name for cursor, not normally used.

Is basically a record which has no visible parts. Cursor entities currently exist in JSP.

Another invisible entity 66 is the 'EntityCursor' Entity.
Contained by: Container
Contains: None
A-param: Id, name, require
O-param: None The meaning of the parameters for these user input entities 66 are defined as:
name—Name for cursor, not normally used.

This entity adds an Entity Cursor to the resultant app 30. This can/should only be done in the application editor 46.

Another invisible entity 66 is the 'XMLParsing' Entities.
Contains: None

An Entity 66 which takes XML input as string and Parses the XML code 38.

Another type of entity are the Database Query Entities, or 'QJoin' Entities

Contained by: Container
Contains: Any
A-param: Name, Style, Condition
O-param: none The meaning of the parameters for these user input entities 66 are defined as:
Name;
Style; and
condition.

QJoin entity 66 as a child of the query. The QJoin entity 66 requires two children, the left table, and the right table in the join. The two parameters required are: style(left, right, full) condition: which is what links the two tables together. I.e. table1.name=table2.name The table relationships can have one parameter: tableas which defines an alias for the table, when joining a table with itself.

Another type of database query entity 66 is the 'QJoinRecursive' Entities.
Contained by: Container
Contains: Any
A-param: Name, style, condition
O-param: None The meaning of the parameters for these user input entities 66 are defined as:
Name;
Style; and
condition.

The recursive join option allows you to create extra rows which create additional rows in the result set to enumerate many possible parent child combinations.

Another type of query entities 66 are 'Query' Entity.
Contained by: Containers, Field Entity, Navigator Entity, Grid Entity, Record Entity
Contains: None
A-param: Id, name, where, group
O-param: None The meaning of the parameters for these user input entities 66 are defined as:
id—Reference use;
where—Where Constraints;
group—Group by clause; and
order—Order by clause.

This Entity corresponds to a SQL Query It is used in the following classes: QuertySet.java RequireQuery.java SQueryBase.java.

Another type of query entity 66 is 'CustomQuery' Entity.
Contained by: Container
Contains: None
A-param: Id, name, where, group, order
O-param: None A custom Query is used depending on what kind of access to the datasource 20a,b you are using.

Another type of query entity 66 is 'QueryBase' Entities.
Contains: None

An Entity 66 which is essentially a base form for the Query Entity.

Accordingly, the above described sample entities 66 can be used with appropriate relationships 70 to control the presentation and functionality of widgets 60 on an interface screen 58 of the interface of the device 18, as well as provide operational behavior and structure to the components of the end tier 14 and middle tier 26 of the system 10. This integrated operational structure is supplied by the subprograms 32, 34, 36 of the application 30, which can be generated for a selected combination of hardware/software platforms in the tiers 14, 16, 26 according to the file 38 parameters 40, 44, as processed by the generator 42.

FIG. 11 shows example deployment configurations of the application 30 over the various tiers 14, 16, 26 of the system 10. For example, using the pass through 24 system of the middle tier 26 facilitates the access of the devices 18 directly to inhouse data servers, low to medium demand data driven websites, and low to medium cell phone data access. In addition, other example deployments could be through the EJB server 28a of the middle tier 26, thereby facilitating access of the devices 18 for inhouse EJB systems, intranet applications, high demand data driven websites over the internet, and large volume cell phone data access. As well, middle tier technology 26 using the COM server 28b could be similar to that provided by the EJB server 28a in deployment configuration. Furthermore, custom deployments using the custom queries 148 could be to interface various JAVA, web, or cell phone graphical user interfaces on the various devices 18 to custom data stores 20a, b.

Figure 12:
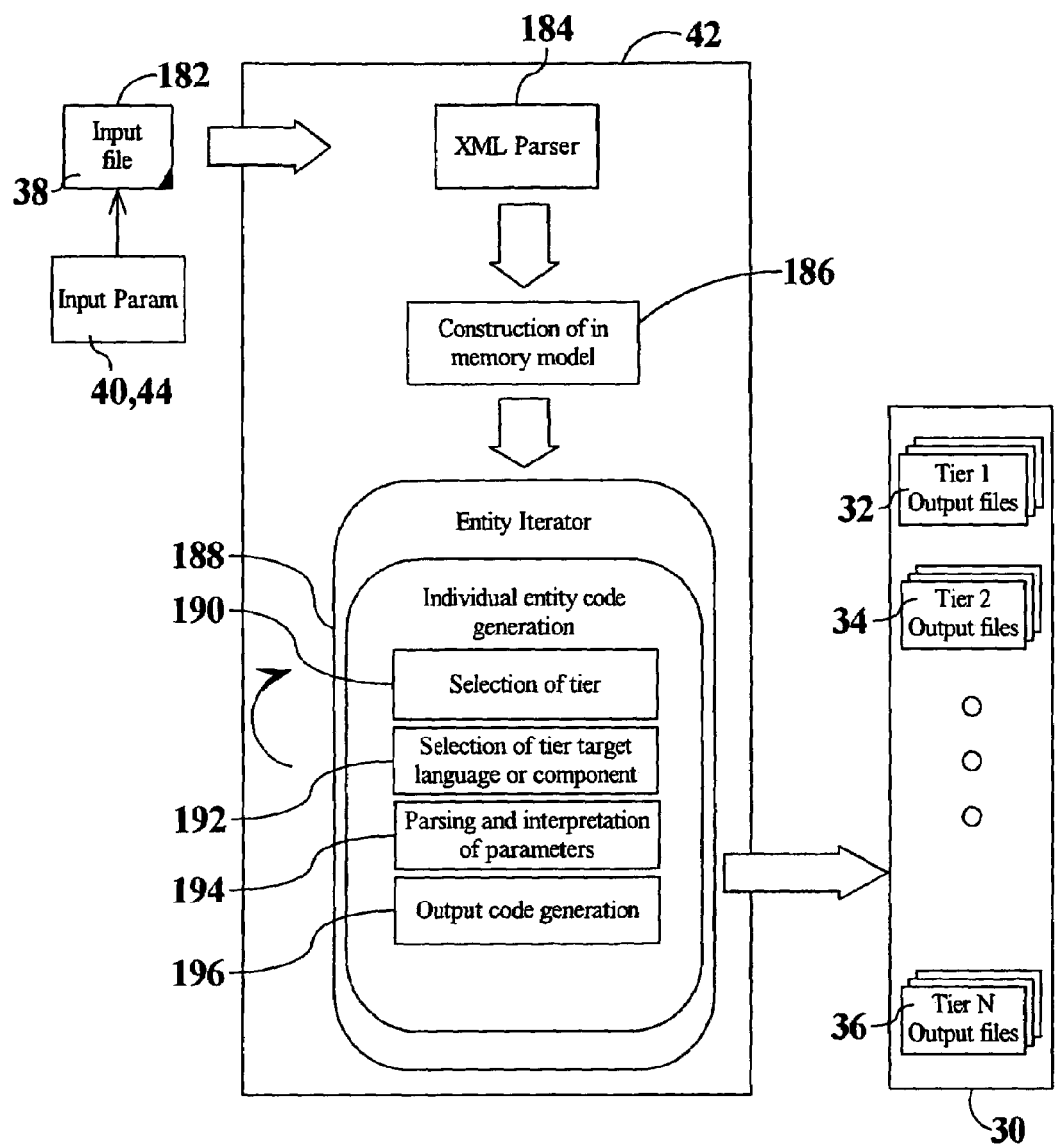
FIG. 12 is a block diagram of the operation of the system of FIG. 2.

Referring to FIG. 12, in operation of the application development system 12 the software developer constructs the abstract notation representation file 38 through input of the parameters 40, 44 at step 182. The file 38 is the declaration of all the various components to be found in the end application 30, such as but not limited to grids, records, screens, database queries, and database tables. These components or entities 66 are hooked or logically linked to one another through relationships 70, as described above, which is accomplished by a series of parent child relationships 70. Accordingly, the entity 66 can be reused through the relationships 70, such as selecting an employer from a list and displaying relevant information in an accompanying grid. The input parameters can also be used to program custom business logic using message based architecture, whereby the software developer can use the custom components of neurons to coordinate the acceptance, processing, and sending out of messages used during the access of the databases 20a, b from the devices 18 of the system 10. Furthermore, the parameters 40, 44 can be used to define custom reports to perform complex functions, whereby both the neurons and the reports can be made up of procedural XML. Furthermore, internationalized strings can be part of the input parameters 40, 44 to include the addition of functionality in multiple languages, such as using English and French labels, such as using the example XML code below.

EXAMPLE XML

```
01  <entity ID="localeTable" type="Localization">
02      <localization>
03          <locale name="english">
04              <string refid="100">Manage Exchanges</string>
05              <string refid="101">Active Exchanges</string>
06              <string refid="102">Manage Hardware</string>
07              <string refid="103">Manage Hardware</string>
08              <string refid="104">Status for Exchange</string>
09              <string refid="105">Test Device</string>
10          </locale>
11          <locale name="french">
12              <string refid="100">Contrôlez les Échanges</string>
13              <string refid="101">Les Échanges Actifs</string>
14              <string refid="102">Manage Hardware</string>
```

-continued

```
15              <string refid="103">Contrôlent Le Matériel</string>
16              <string refid="104">Status de l'Échange</string>
17              <string refid="105">Test l'Appareil</string>
18          </locale>
19      </localization>
20  </entity>
```

Accordingly, the example code contains the definition of labels to be used by the graphical user interface of the device 18, wherein lines 3 through 10 enclose the definition of English labels while lines 11 through 18 enclose the definition of French labels.

Referring to FIG. 12, the file 38 is then read into the application generator 42 and the XML description is parsed at step 184 and its syntax is validated through the checking of errors. The next step at 186 is to construct an inmemory representation of the input file 38 by the generator 42, whereby each target language of the file 38 is represented by an object. At the entity iterator stage 188, the generator 42 accesses each individual entities 66 code in the memory model to generate code for each and every object, which is used to generate individual language stubs or platform indicator for the beginning and end of the program 30, as well as processing the corresponding XML description 38 to facilitate generation of application subprograms 32, 34, 36 for the corresponding target languages or platforms selected. This process is used in conjunction with the parameters 40, 44 for the selection of the corresponding tier at step 190 and the selection of corresponding tier target language at step 192. Accordingly, each object type in the inmemory model of step 186 has a group of corresponding entities which are used to define the code to be generated for the corresponding entity group in the selected platforms. Furthermore, the parameters of the entity 66 are parsed and interpreted at step 194 and then the output code is generated at step 196 for a selected tier output file 32 by which the central platform application 30 is generated. The abstract notation form of the data contained in the file 38 is thereby transformed to selected language or platform notation as determined by the input parameter 40, 44 and stubs. Accordingly, the next series or entity group represented by the next language or platform stub, positioned by the target language object, at the beginning and end of the entity group is processed by the entity iterator 188 through the above mentioned steps 190, 192, 194, 196 to output the output file 34 for the next tier platform. The entity iterator 188 process continues until all of the output files have been generated for the selected number of tiers 14, 16, 26 (and others if desired) to complete the central application platform 30. Accordingly, the output 30 is a series of source files 32, 34, 36 split across the tiers 14, 16, 26 of the application 30, which can be compiled on specified target platforms that may or may not be in the same language or on the same platform or machine. Furthermore, it should be noted that the source code of the application 30 can be generated at the time of program building is set up once per end user access. Therefore, the development system 12 facilitates the output of a series of programs 32, 34, 36 each of which potentially executes in a different language or on a different machine which corresponds to a distributed n-tier application platform 30. The system 12 can give auto generation of the application 30 for different platforms, much as but not limited to JAVA, Tcl, Php, C, their middle tier 26 components COM 28b, EJB 28a, and their final database schemas 20a, b.

Figure 13:
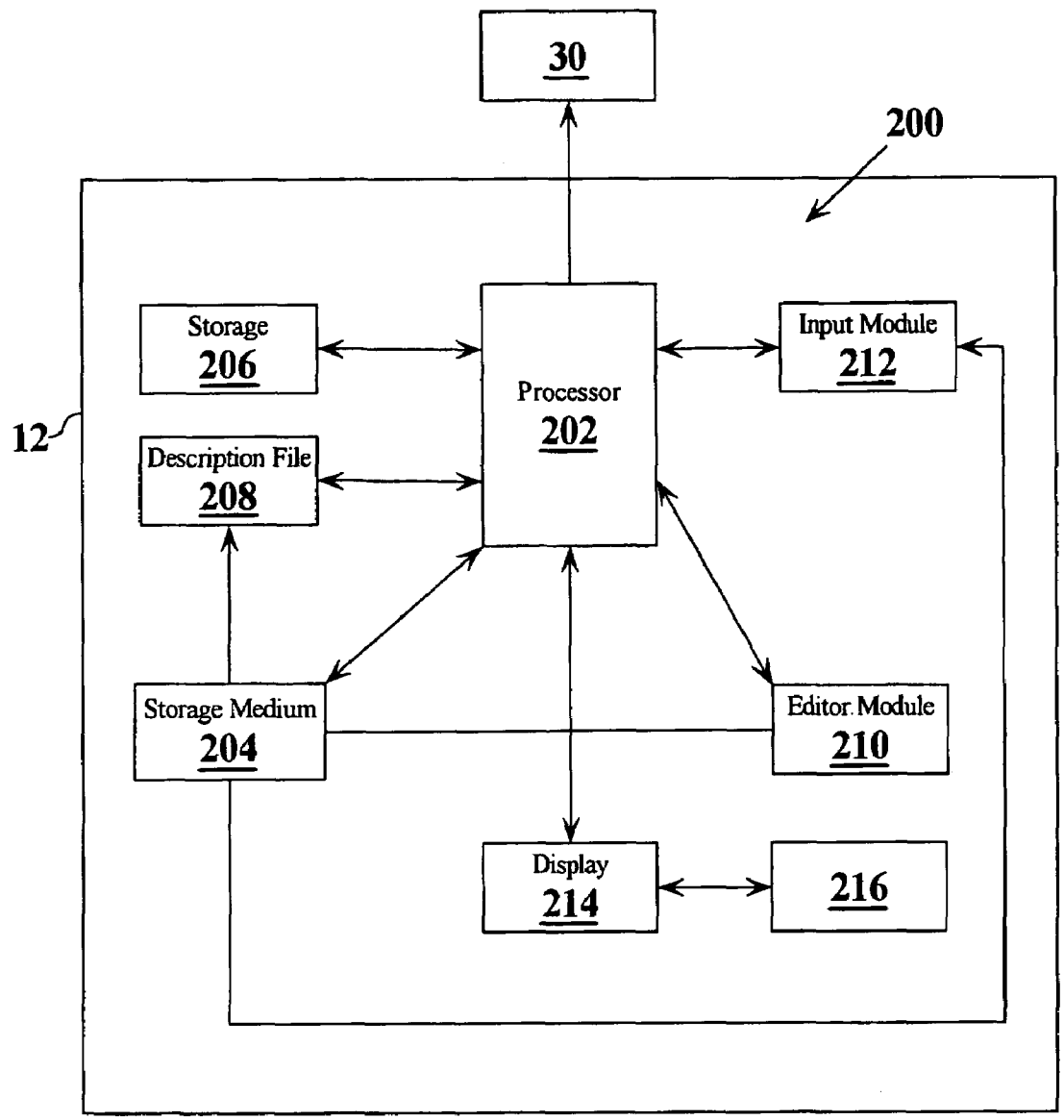
FIG. 13 is a further embodiment of the system of FIG. 2.

Referring to FIG. 13, further embodiment of the system 12 can include a computer system 200 comprising a processor 202 coupled to a storage medium 204 and memory 206. The processor 202 monitors the download or transfer of the description file module 208, the editor module 210, and the input module 212 to be used to generate the application file 30. The processor is also coupled to a display 214, which can be used by the software designer to coordinate the generation of the file 30. An input device 216, such as a keyboard, a mouse, or a voice activated device can be used to input data and other commands into the processor 202 to facilitate in the generation of the file 30. Furthermore, the display 214 could be touch sensitive for use as an input device 216. A computer readable storage medium 204 is coupled to the processor 202 for providing an operating system or the software of the other modules 208, 210, 212 to the computer 200. The storage medium 204 could also represent downloaded data accessed over a network. The computer readable medium 204 can include hardware and/or software, such as by way of example only, magnetic discs, magnetic tape, optically readable media, such as CD ROMs, and semi conductor memory, such as PCMCIA cards. In each case, the medium 204 may take the form of a portable item such as a small disc, floppy diskette, cassette, or may take the form of a relatively large or immobile item such as a hard disk drive, a solid state memory card, or RAM provided in the computer system 200. It should be noted that the above listed example mediums 204 can be used either alone or in combination. Accordingly, the operation of the system 12 can be provided by software containing the above system 12 features as software modules.

Although the system 10 and 12 have been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A system for generating a multi-tier application for deployment on selected platforms, said multi-tier application having a plurality of sub-applications each representing a tier, each sub-application having at least one component, said components being deployable on at least one of said selected platforms, the system comprising:
    a) an abstract notation description file containing a description of said multi-tier application to define a predetermined combination of said components of said multi-tier application, each tier having at least one component selected for said combination;
    b) an editor for entering a selected set of input parameters into said description file; and
    c) an application generator for transforming the description file based on said selected set of input parameters from abstract notation to platform notations, each one of said selected components being represented in one of said platform notations for executing said component on a platform of said selected platforms;
wherein the deployment of the multi-tier application facilitates communication of data between components deployed on neighboring tiers.

2. The system according to claim 1, wherein at least two of the selected platforms are different.

3. The system according to claim 2 wherein the description file includes platform indicators in the description, said description being capable of representing multiple versions of said multi-tier application deployable on different platforms specified by said platform indicators.

4. The system according to claim 1 wherein at least one of said plurality of tiers has more than one component selected and said communication of data defines multiple co-existing data paths, said multiple data paths each linking different components deployed on neighboring tiers.

5. A method for generating a multi-tier application for deployment on selected platforms, said multi-tier application having a plurality of sub-applications each representing a tier, each sub-application having at least one component, said components being deployable on at least one of said selected platforms, the method comprising the steps of:
    a) providing a description of said multi-tier application in an abstract notation description file, said description defining a predetermined combination of said components of said multi-tier application, each tier having at least one component selected for said combination;
    b) selecting input parameters for said multi-tier application;
    c) inputting the input parameters into said abstract notation description file;
    d) transforming the description file based on said input parameters from abstract notation to platform notations, each one of said selected components being represented in one of said platform notations for executing said component on a platform of said selected platforms; and
    e) generating said multi-tier application from the platform notations;
wherein deployment of the multi-tier application to respective ones of said selected platforms facilitates the communication of data between components deployed on neighboring tiers.

6. A computer program product for generating an application for deployment on selected platforms, said application having a plurality of components each deployable on at least one of said selected platforms, the product comprising;
    a) a computer readable medium;
    b) an abstract notation description module stored on said computer readable medium for containing a description of the application module to define a predetermined combination of selected components of said application;
    c) an editor module coupled to the description module for entering a selected set of input parameters into the description file;
    d) an application generator module coupled to said description module for transforming the abstract notation description file to multiple selected platform notation files based on said selected set of input parameters, said platform notation flies each representing one of the selected components; and
    e) an application module coupled to the application generator module for receiving the multiple selected platform notation files;
wherein said program product generates the selected platform notation files for deployment of the application to the selected platforms.

7. A system for generation of a multi-tier application, said multi-tier application having a predetermined combination of components deployable on selected platforms, the system comprising:

a) an abstract notation description file to contain a description of the multi-tier application, the description file being capable of representing multiple sub-applications deployable on said selected platforms, each said sub-application representing a tier and including at least one component selected from said predetermined combination of components;
b) an editor for entering a selected set of input parameters into the description file; and
c) an application generator for transforming the description file from abstract notation to a plurality of selected platform notations, said platform notations each including respective platform indicators to specify platforms for each selected components and representing said selected components deployable on respective specified platforms;

wherein the application is deployable as a series of said selected components on their respective tiers for execution on their respective said specified platforms and the deployment of the application facilitates the communication of component data between components deployed on neighboring tiers.

* * * * *